US012080085B2

(12) United States Patent
Garbuzov

(10) Patent No.: US 12,080,085 B2
(45) Date of Patent: Sep. 3, 2024

(54) SYSTEMS AND METHODS FOR RECOVERING NUMERICAL READINGS OF CUMULATIVE FLOW METERS BASED ON NOISY IMAGE DATA

(71) Applicant: Yuri P. Garbuzov, Newport Coast, CA (US)

(72) Inventor: Yuri P. Garbuzov, Newport Coast, CA (US)

( * ) Notice: Subject to any disclaimer, the term of this patent is extended or adjusted under 35 U.S.C. 154(b) by 75 days.

(21) Appl. No.: 18/097,961

(22) Filed: Jan. 17, 2023

(65) Prior Publication Data
US 2024/0242523 A1    Jul. 18, 2024

(51) Int. Cl.
*G06F 7/24* (2006.01)
*G06V 30/148* (2022.01)

(52) U.S. Cl.
CPC ................................ *G06V 30/153* (2022.01)

(58) Field of Classification Search
CPC ...... G06V 30/153; G06V 20/36; G06V 20/63; G06V 2201/02; G06T 1/0007; G06T 7/0004; G06T 7/11; G06T 7/70; G06T 2207/20132; G06T 2207/30164; H04N 23/80; H04N 7/18; H04N 7/183; Y04S 20/30

See application file for complete search history.

(56) References Cited

U.S. PATENT DOCUMENTS

| 7,349,588 | B2 * | 3/2008 | Butterworth | G06V 10/44 382/209 |
| 2021/0108983 | A1 * | 4/2021 | Garbuzov | G01L 11/00 |

* cited by examiner

*Primary Examiner* — Mekonen T Bekele
(74) *Attorney, Agent, or Firm* — LOZA & LOZA, LLP; Richard H. Krukar

(57) ABSTRACT

A meter readout on a meter has digits including a first digit, a second digit, etc. A sequence of images of the meter is obtained. The images include images of the digits in the meter readout. Automated recognition of the digits in the images result in likelihood arrays indicating the likelihoods for the digit values for the digits imaged in the meter images. Short chains of digit values are identified and spliced together to form a series of single digit, two-digit, three-digits, etc. paths that are built up based on the likelihood arrays. Various criteria are used to discard most of the chains and thereby avoid the combinatorial explosion of possible paths and thereby produce reliable meter readings without consuming considerable computational resources.

20 Claims, 21 Drawing Sheets

First Image Likelihood Arrays ($L_1$)
320

Likelihood Array ($L_{1,1}$)
321

- $L(0)_{1,1} = 0.098$
- $L(1)_{1,1} = 0.041$
- $L(2)_{1,1} = 0.011$
- $L(3)_{1,1} = 0.124$
- $L(4)_{1,1} = 0.304$
- $L(5)_{1,1} = 0.079$
- $L(6)_{1,1} = 0.017$
- $L(7)_{1,1} = 0.049$
- $L(8)_{1,1} = 0.134$
- $L(9)_{1,1} = 0.143$

Likelihood Array ($L_{1,2}$)
322

- $L(0)_{1,2} = 0.266$
- $L(1)_{1,2} = 0.102$
- $L(2)_{1,2} = 0.102$
- $L(3)_{1,2} = 0.105$
- $L(4)_{1,2} = 0.073$
- $L(5)_{1,2} = 0.053$
- $L(6)_{1,2} = 0.097$
- $L(7)_{1,2} = 0.091$
- $L(8)_{1,2} = 0.091$
- $L(9)_{1,2} = 0.020$

Likelihood Array ($L_{1,3}$)
323

- $L(0)_{1,3} = 0.286$
- $L(1)_{1,3} = 0.034$
- $L(2)_{1,3} = 0.074$
- $L(3)_{1,3} = 0.121$
- $L(4)_{1,3} = 0.168$
- $L(5)_{1,3} = 0.014$
- $L(6)_{1,3} = 0.010$
- $L(7)_{1,3} = 0.057$
- $L(8)_{1,3} = 0.185$
- $L(9)_{1,3} = 0.151$

Likelihood Array ($L_{1,4}$)
324

- $L(0)_{1,4} = 0.332$
- $L(1)_{1,4} = 0.066$
- $L(2)_{1,4} = 0.092$
- $L(3)_{1,4} = 0.001$
- $L(4)_{1,4} = 0.153$
- $L(5)_{1,4} = 0.090$
- $L(6)_{1,4} = 0.074$
- $L(7)_{1,4} = 0.049$
- $L(8)_{1,4} = 0.073$
- $L(9)_{1,4} = 0.070$

Likelihood Array ($L_{1,5}$)
325

Initial digit path spliced together from initial digit chains, path includes an element for every image Two Digit Chain → Five element chain for two digit values, segment is images 5 through 9

$(60; L(60)_5); (63; L(63)_6); (65; L(65)_7); (67; L(67)_8); (68; L(68)_9)$

Two digit path spliced together from two digit chains, path includes an element for every image $(44; L(44)_1); (46; L(46)_2); (49; L(49)_3); (55; L(55)_4); (60; L(60)_5);$
$(63; L(63)_6); (65; L(65)_7); (67; L(67)_8); (68; L(68)_9); .... (91; L(91)_{100})$ Three Digit Value | Likelihood of Three Digit Value $(400; L(400)_1) = (400; L(40)_1 * 0.286)$ Element of Three Digit Chain Sequence Index Five element chain for three digit values, segment is images 96 through 100

$(893; L(893)_{96}); (894; L(894)_{97}); (915; L(915)_{98}); (912; L(912)_{99}); (919; L(919)_{100})$

Three Digit Chain

Three digit path spliced together from three digit chains, path includes an element for every image $(440; L(440)_1); (465; L(465)_2); (497; L(497)_3); (553; L(553)_4); (602; L(602)_5); (639; L(639)_6); (655; L(655)_7); (674; L(674)_8); (681; L(681)_9); .... (919; L(919)_{100})$ Initial Digit Likelihood for image i: $L(d_1)_i = L(d_1)_{i,1}$ Two-Digit Likelihood for image i: $L(d_1 d_2)_i = L(d_1)_i * L(d_2)_{i,2}$ Three-Digit Likelihood for image i: $L(d_1 d_2 d_3)_i = L(d_1 d_2)_i * L(d_3)_{i,3}$

SYSTEMS AND METHODS FOR RECOVERING NUMERICAL READINGS OF CUMULATIVE FLOW METERS BASED ON NOISY IMAGE DATA

TECHNICAL FIELD

The embodiments relate to optical character recognition, automated meter reading, statistical inferencing, and machine learning.

BACKGROUND

Automated meter reading for public utilities is being implemented in many areas by installing new meters that include communications subsystems. Such implementations involve replacing legacy meters with new meters. These implementations are expensive because the metering devices (e.g., gas meters, electric meters, water meters) are expensive.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented by a system. The system can include a memory storing a plurality of likelihood arrays indicating a plurality of likelihoods at a sequence of times for a plurality of digit values for a plurality of digits of a meter readout, and a processor operatively coupled to the memory. The processor can obtain a first path that includes a sequence of first path values that are associated with the sequence of times, use the first path and the likelihood arrays to assemble a chain set that includes a plurality of chains that include a plurality of second path chain elements, use a chain criteria to limit a chain set size of the chain set, form a second path set by splicing the chains at a plurality of chain overlaps, use a final selection criterion to select a final trajectory that passes through the second path, and output the final trajectory as a sequence of readings of the meter readout, wherein the second path chain elements are chain elements that include a value and a likelihood of the value, and wherein the values of the second path chain elements include at least one more digit than the first path values.

Another aspect of the subject matter described in this disclosure can be implemented by a method. The method can include storing a plurality of likelihood arrays indicating a plurality of likelihoods at a sequence of times for a plurality of digit values for a plurality of digits of a meter readout, obtaining a first path that includes a sequence of first path values that are associated with the sequence of times, using the first path and the likelihood arrays to assemble a chain set that includes a plurality of chains that include a plurality of second path chain elements, using a chain criteria to limit a chain set size of the chain set, forming a second path set by splicing the chains at a plurality of chain overlaps, using a final selection criterion to select a final trajectory that passes through the second path, and outputting the final trajectory as a sequence of readings of the meter readout, wherein the second path chain elements are chain elements that include a value and a likelihood of the value, and wherein the values of the second path chain elements include at least one more digit than the first path values.

Yet another aspect of the subject matter described in this disclosure can be implemented by non-transitory computer readable medium storing computer readable instructions, that when executed on one or more processors, implements a method. The method can include storing a plurality of likelihood arrays indicating a plurality of likelihoods at a sequence of times for a plurality of digit values for a plurality of digits of a meter readout, obtaining a first path that includes a sequence of first path values that are associated with the sequence of times, using the first path and the likelihood arrays to assemble a chain set that includes a plurality of chains that include a plurality of second path chain elements, using a chain criteria to limit a chain set size of the chain set, forming a second path set by splicing the chains at a plurality of chain overlaps, using a final selection criterion to select a final trajectory that passes through the second path, and outputting the final trajectory as a sequence of readings of the meter readout, wherein the second path chain elements are chain elements that include a value and a likelihood of the value, and wherein the values of the second path chain elements include at least one more digit than the first path values.

In some implementations of the methods and devices, a sequence of meter images is taken at the sequence of times, the digits are imaged in the meter images as a plurality of digit images of the digits, and each one of the likelihood arrays indicates a plurality of digit value likelihoods for only one of the digits and only one of the meter images. In some implementations of the methods and devices, the meter readout includes a highest order digit, an initial chain set is assembled that includes a plurality of initial digit chains assembled from the likelihood arrays for the highest order digit, initial chain criteria are used to limit an initial chain set size of the initial chain set, an initial digit path is formed by splicing the initial digit chains at a plurality of initial chain overlaps, and the initial digit path is the first path. In some implementations of the methods and devices, the meter readout includes a highest order digit and a second highest order digit, an initial chain set is assembled that includes a plurality of initial digit chains assembled from the likelihood arrays for the highest order digit, initial chain criteria are used to limit an initial chain set size of the initial chain set, an initial digit path is formed by splicing the initial digit chains at a plurality of initial chain overlaps, the likelihood arrays and the initial digit path are used to assemble a second chain set that includes a plurality of two-digit chains that are sequences of two-digit values for the highest order digit and the second highest order digit, a second chain criteria is used to limit a second chain set size of the second chain set, a two-digit path is formed by splicing the two-digit chains at a second plurality of chain overlaps, and the two-digit path is the first path. In some implementations of the methods and devices, the first path is an initial digit path for a highest order digit of the meter readout, the second path set is a two-digit path set for the highest order digit and a second highest order digit of the meter readout, the meter readout includes a third highest order digit, the likelihood arrays and the two-digit path set are used to assemble a third chain set that includes a plurality of three-digit chains that are sequences of three-digit values for the highest order digit, the second highest order digit, and the third highest order digit, a third chain criteria is used to limit a third chain set size of the third chain set, and a three-digit path set is formed by splicing the three-digit chains at a third plurality of chain overlaps, wherein the final trajectory that passes through a three-digit path in the three-digit path set.

In some implementations of the methods and devices, the chain criteria include a chain likelihood threshold. In some implementations of the methods and devices, the chain criteria include a chain likelihood threshold or a maximum chain set size. In some implementations of the methods and devices, the chain criteria include a maximum initial chain set size that limits how many of the chains are included in the chain set, and the chain set includes the chains that are most likely. In some implementations of the methods and devices, the chain criteria include a jump restriction. In some implementations of the methods and devices, the chain criteria include a monotonicity restriction. In some implementations of the methods and devices, the chain criteria include a requirement that each one of the chains is spliceable with another one of the chains. In some implementations of the methods and devices, a first path set includes two paths, one of the paths is the first path, and the likelihood arrays and both of the two paths are used to assemble the chain set.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 3B is a high-level conceptual diagram of likelihood arrays produced from an image of a meter according to some aspects.

Throughout the description, similar reference numbers may be used to identify similar elements.

DETAILED DESCRIPTION

Figure 1:
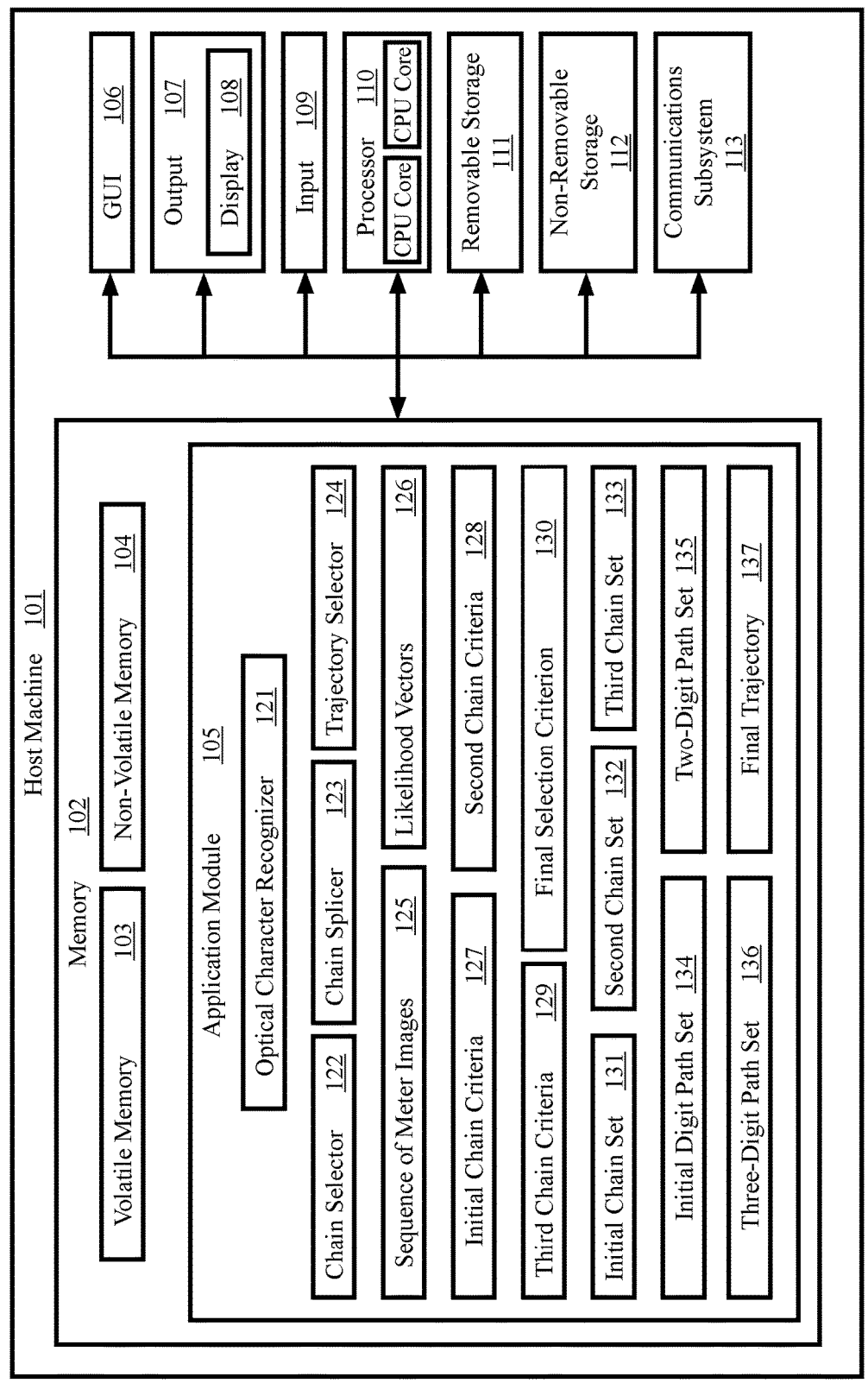
FIG. 1 is a high-level block diagram of a host machine that can recover numerical readings of cumulative flow meters based on noisy image data according to some aspects.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Millions of meters currently installed and in use are not designed to share their readings in real time. During the 2015 drought in California, the best solution local utilities were able to offer their customers to guide water consumption was to check the meters every night and to share the numbers with a data processing company to generate recommendations. There are obvious benefits from having live reliable consumption data (water, gas, electricity) to create working incentives for conservation of resources (pricing schemes will have a real effect on consumer choices) as well as saving money (no need to send technicians to read each old meter) and providing much more data for utilities. To further elaborate on potential benefits to the consumer, having this information for Internet of Things (IOT) solutions can be an important component of the value proposition not only a leak detection but a constantly working money saving tool potentially paying off for the investment by recommending cheaper times to run appliances and turning incomprehensible water pricing into straightforward dollars and cents per shower, bath or running outdoor sprinklers.

While there are a couple technologies to automate readings. For example, counting ticks of an existing meter is a solution but is flawed because interruptions lead to unknown gaps between actual and counted values. Another solution combines a camera with a transmitter designed to communicate actual meter readings in real time. Unfortunately, the camera images must be read in order to discern the meter readings and those images often include noise or obstructions blocking the view of the meter. An optical character recognition (OCR) algorithm may be used to read the meters. Even with a 95% accuracy in interpreting individual digits, almost a quarter (23%) of five-digit numbers "read" via OCR will be incorrect. The only solution currently accepted by utility companies is smart meters, which are expensive and expensive to install because they require power and communications infrastructure. The disclosure herein offers meter readings that are statistically consistent and stable, and converge on the correct value when available. This offers a way to elevate the reliability of the data to where it can be used for billing and monitoring. Furthermore, low cost cameras can be used to obtain the images of the meter's readout. Deploying such cameras can be far more cost effective than upgrading existing meters.

FIG. 1 is a high-level block diagram of a host machine that can recover numerical readings of cumulative flow meters based on noisy image data according to some aspects. A computing device in the form of a computer 101 configured to interface with controllers, peripheral devices, and other elements disclosed herein, may include one or more processing units 110, memory 102, removable storage 111, and non-removable storage 112. Memory 102 may include volatile memory 103 and non-volatile memory 104. Host machine 101 may include or have access to a computing environment that includes a variety of transitory and non-transitory computer-readable media such as volatile memory 103 and non-volatile memory 104, removable storage 111 and non-removable storage 112. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data. Of the listed computer storage, volatile memory and most RAM, such as dynamic RAM (DRAM), are transitory while the others are considered non-transitory.

Host machine 101 may include, or have access to, a computing environment that includes input 109, output 107, and a communications subsystem 113. The host machine 101 may operate in a networked environment using a communications subsystem 113 to connect to one or more remote computers, remote sensors and/or controllers, detection devices, hand-held devices, multi-function devices (MFDs), speakers, mobile devices, tablet devices, mobile phones, smartphone, or other such devices. The remote computer may also be a personal computer (PC), server, router, network PC, radio frequency identification (RFID) enabled device, a peer device or other common network node, or the like. The 265 communication connection may include a local area network (LAN), a wide area network (WAN), Bluetooth connection, or other networks.

Output 107 is most commonly provided as a computer monitor or flat panel display but may include any output device. Output 107 and/or input 109 may include a data collection apparatus associated with host machine 101. In addition, input 109, which commonly includes a computer keyboard and/or pointing device such as a computer mouse, computer track pad, touch screen, or the like, allows a user to select and instruct host machine 101. A user interface can be provided using output 107 and input 109. Output 107 may include a display 108 for displaying data and information for a user, or for interactively displaying a graphical user interface (GUI) 106. A GUI is typically responsive to user inputs entered through input 109 and typically displays images and data on display 108.

Note that the term "GUI" generally refers to a type of environment that represents programs, files, options, and so forth by means of graphically displayed icons, menus, and dialog boxes on a computer monitor screen or smart phone screen. A user can interact with the GUI to select and activate such options by directly touching the screen and/or pointing and clicking with a user input device 109 such as, for example, a pointing device such as a mouse, and/or with a keyboard. A particular item can function in the same manner to the user in all applications because the GUI provides standard software routines (e.g., the application module 105 can include program code in executable instructions, including such software routines) to handle these elements and report the user's actions.

Computer-readable instructions, for example, program code in application module 105, can include or be representative of software routines, software subroutines, software objects, etc. described herein, are stored on a computer-readable medium and are executable by the processor device (also called a processing unit) 110 of host machine 101. The application module 105 can include computer code such as an optical character recognizer 121, a chain selector 122, a chain splicer 123, a trajectory selector 124, a sequence of meter images 125, likelihood arrays 126, initial chain criteria 127, second chain criteria 128, third chain criteria 129, a final selection criterion 130, an initial chain set 131, a second chain set 132, a third chain set 133, an initial digit path set 134, a two-digit path set 135, and a three-digit path set 136. A hard drive, CD-ROM, RAM, flash memory, and a USB drive are just some examples of articles including a computer-readable medium.

Figure 2:
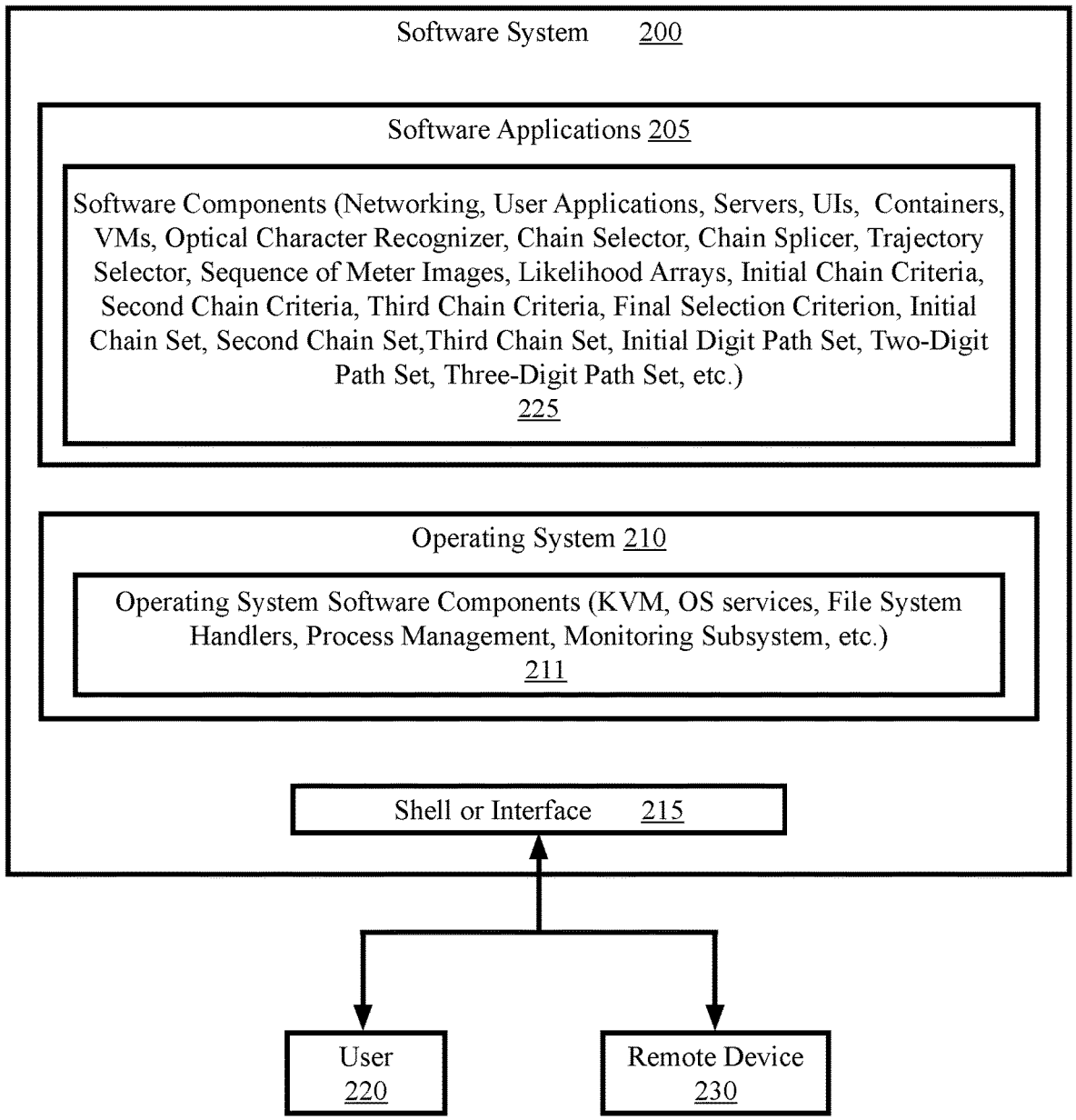
FIG. 2 is a high-level block diagram of a software system according to some aspects.

FIG. 2 is a high-level block diagram of a software system 200, according to embodiments herein. FIG. 2 illustrates a software system 200, which may be employed for directing the operation of data-processing systems such as host machine 101. Software applications 205, may be stored in memory 102, on removable storage 111 or on non-removable storage 112, and generally includes and/or is associated with an operating system 210 and a shell or interface 215. One or more application programs may be "loaded" (i.e., transferred from removable storage 111 or non-removable storage 112 into the memory 102) for execution by the host machine 101. Application programs 205 can include software components 225 such as software modules, software subroutines, software objects, network code, user application code, server code, UI code, container code, virtual machine (VM) code, optical character recognizer code, chain selector code, chain splicer code, trajectory selector code, a sequence of meter images, likelihood arrays, an initial chain criteria, a second chain criteria, a third chain criteria, a final selection criterion, an initial chain set, a second chain set, a third chain set, an initial digit path set, a two-digit path set, a three-digit path set, etc. The software system 200 can have multiple software applications each containing software components. The host machine 101 can receive user commands and data through interface 215, which can include input 109, output 107, and communications connection 113 accessible by a user 220 or remote device 230. These inputs may then be acted upon by the host machine 101 in accordance with instructions from operating system 210 and/or software applications 205 and any software components 225 thereof.

Generally, software components 225 can include, but are not limited to, routines, subroutines, software applications, programs, modules, objects (used in object-oriented programs), executable instructions, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smartphones, tablet devices, multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the terms "component" and "module" as utilized herein may refer to one of or a collection of routines and data structures that perform a particular task or implement a particular abstract data type. Applications and components may be composed of two parts: an interface, which lists the constants, data types, variables, and routines that can be accessed by other modules or routines; and an implementation, which is typically private (accessible only from within the application or component) and which includes source code that actually implements the routines in the application or component. The terms application or component may also simply refer to an application such as a computer program designed to assist in the performance of a specific task such as word processing, accounting, inventory management. Components can be built or realized as special purpose hardware components designed to equivalently assist in the performance of a task.

The interface 215 can include a graphical user interface 106 that can display results, whereupon a user 220 or remote device 230 may supply additional inputs or terminate a particular session. In some embodiments, operating system 210 and GUI 106 can be implemented in the context of a "windows" system. It can be appreciated, of course, that other types of systems are possible. For example, rather than a traditional "windows" system, other operating systems such as, for example, a real time operating system (RTOS) more commonly employed in wireless systems may also be employed with respect to operating system 210 and interface 215. The software application 205 can include, for example, software components 225, which can include instructions for carrying out steps or logical operations such as those shown and described herein.

The description herein is presented with respect to embodiments that can be embodied in the context of, or require the use of, a data processing system such as host machine 101, in conjunction with program code in an application module 105 in memory 102, software system 200, or host machine 101. The disclosed embodiments, however, are not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino, and the like. Therefore, the descriptions of the exemplary embodiments, which follow, are for purposes of illustration and not considered a limitation.

Host machines 101 and software systems 200 can take the form of or run as virtual machines (VMs) or containers that run on physical machines. A VM or container typically supplies an operating environment, appearing to be an operating system, to program code in an application module and software applications 205 running in the VM or container. A single physical computer can run a collection of VMs and containers. In fact, an entire network data processing system including a multitude of host machines 101, LANs and perhaps even WANs or portions thereof can all be virtualized and running within a single computer (or a few computers) running VMs or containers. Those practiced in cloud computing are practiced in the use of VMs, containers, virtualized networks, and related technologies.

Figure 3A:
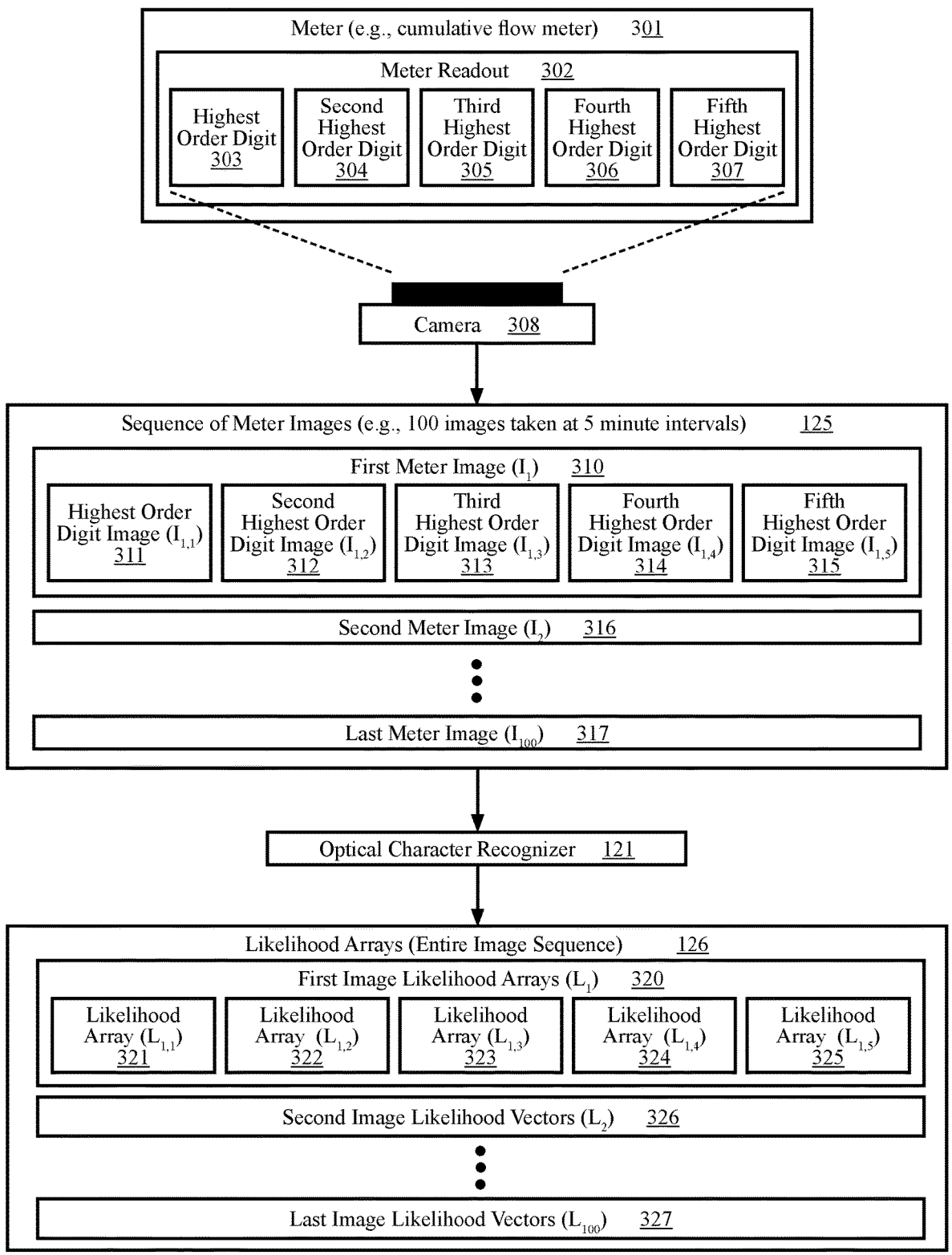
FIG. 3A is a high-level conceptual diagram of producing likelihood arrays from a sequence of images acquired by imaging a meter, according to some aspects.

FIG. 3A is a high-level conceptual diagram of producing likelihood arrays 126 from a sequence of images 125 acquired by imaging a meter 301, according to some aspects. The meter 301 has a meter readout 302 that displays a number of digits to indicate a meter reading. The digits can include a highest order digit 303, a second highest order digit 304, a third highest order digit 305, a fourth highest order digit 306, and a fifth highest order digit 307. The meter 301 can be a cumulative flow meter. The meter readout 302 of a cumulative flow meter always displays increasing values until reaching a maximum readout value (e.g., 99999). After reaching the maximum value, the meter readout 302 of the cumulative flow meter may wrap around to display a minimum readout value (e.g., 00000) and may thereafter display increasing values.

A camera 308 can obtain a sequence of meter images 125 such as a sequence of 100 meter images that includes a first meter readout image ($I_1$) 310, a second meter readout image ($I_2$) 316, and a last meter readout image (e.g., $I_{100}$) 317. The subscripted value is the sequence index, often simply called the index, of the image. The meter images may be taken at a sequence of times such as regular intervals (e.g., once every hour). A 100 image sequence could thereby be obtained in 99 hours. Each of the meter images includes digit images of the digits of the meter readout 302. For example, the first meter readout image ($I_1$) includes a highest order digit image ($I_{1,1}$) 311, a second highest order digit image ($I_{1,2}$) 312, a third highest order digit image ($I_{1,3}$) 313, a fourth highest order digit image ($I_{1,4}$) 314, and a fifth highest order digit image ($I_{1,5}$) 315. The nomenclature for meter images has a subscripted digit that indicates the sequence index, or image number, of the image in the image sequence. The nomenclature for the digit images has a first subscripted digit that indicates the sequence index and a second subscripted digit that indicates the digit position.

An optical character recognizer 121 can read the digits in the meter images 125 to thereby produce likelihood arrays 126 for the sequence of meter images 125. For example, the likelihood arrays 126 can include first image likelihood arrays ($L_1$) 320, second image likelihood arrays ($L_2$) 326, and last image likelihood arrays (L100) 327. The examples considered herein use sequences of one hundred images of the meter. In practice, any number of images may be used. The nomenclature for image likelihood arrays follows the nomenclature for meter images by having a subscripted digit that indicates the sequence index of the image in the image sequence that is used for producing the image likelihood array. In some implementations, the camera 308 and the optical character recognizer 121 are at different locations. For example, the optical character recognizer 121 may be located running in a virtual machine (VM) in a data warehouse. The meter images can be transmitted to the VM in the data warehouse where the optical character recognizer 121 produces the likelihood arrays and stores them at the data warehouse. In some other implementations, the camera may have sufficient onboard processing such that the optical character recognizer 121 is running in the camera. As such, the camera can produce the likelihood arrays 126 and transmit the likelihood arrays 126 to a data warehouse or other location for storage and further processing. Low cost cameras with sufficient processing are already available in certain formats such as smart phones.

The image likelihood arrays 126 include a likelihood array for each digit. Each of the image likelihood arrays includes digit value likelihoods for each possible digit value of a digit in a digit image. For example, the optical character recognizer 121 can be used to recognize the digits in $I_1$, thereby producing first image likelihood arrays ($L_1$) 320 that includes a likelihood array ($L_{1,1}$) 321 for the digit imaged in $I_{1,1}$, a likelihood array ($L_{1,2}$) 322 for the digit imaged in $I_{1,2}$, a likelihood array ($L_{1,3}$) 322 for the digit imaged in $I_{1,3}$, a likelihood array ($L_{1,4}$) 322 for the digit imaged in $I_{1,4}$, and a likelihood array ($L_{1,5}$) 322 for the digit imaged in $I_{1,5}$. The nomenclature for the likelihood arrays has a first subscripted digit that indicates the sequence index and a second subscripted digit that indicates the digit position. $L(N)_{i,j}$ is the likelihood that the jth digit in the ith image has the digit value N.

Figure 3B:
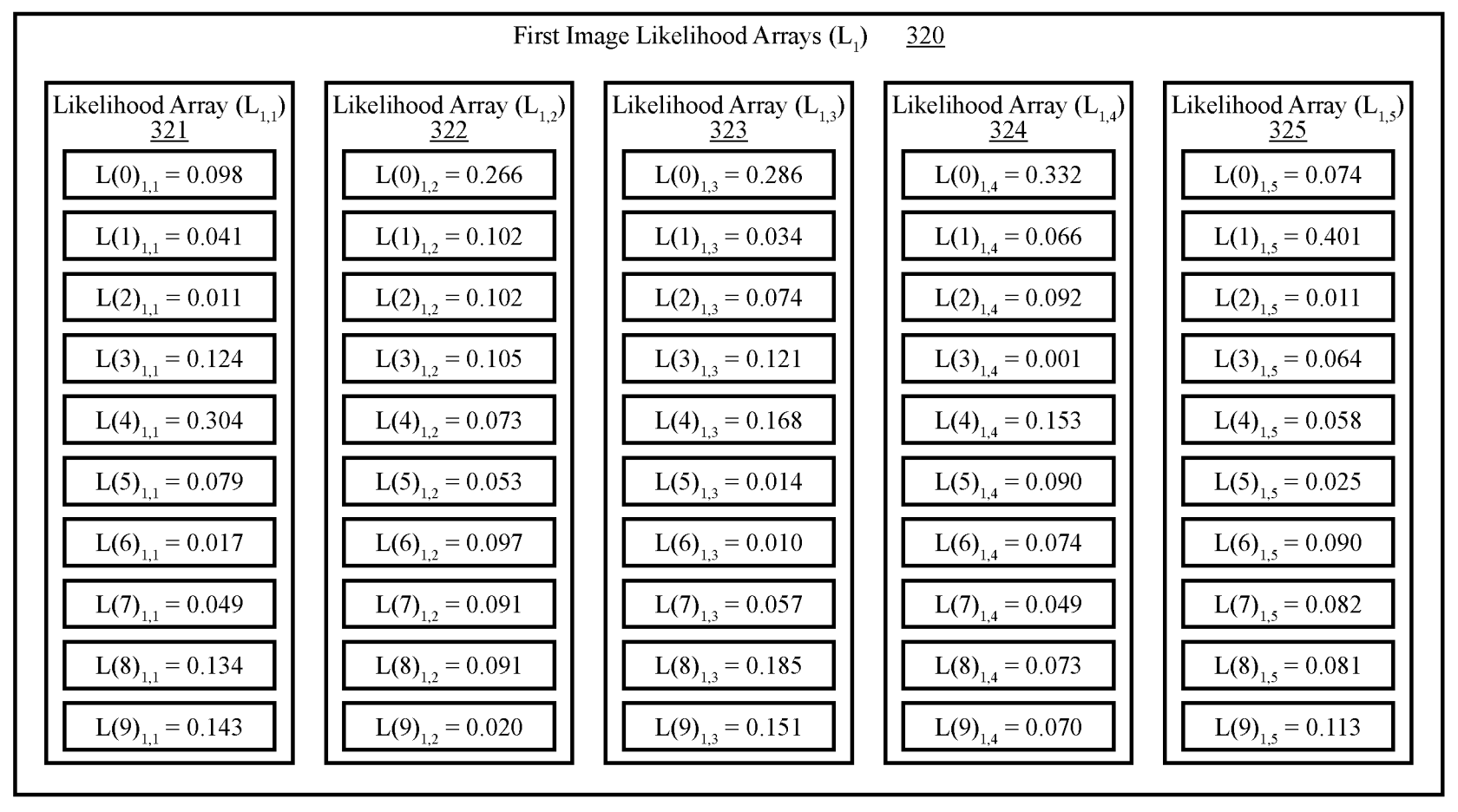

FIG. 3B is a high-level conceptual diagram of likelihood arrays produced from an image of a meter according to some aspects. The optical character recognizer may produce a likelihood array of the probability that each of the imaged digits is a particular digit value. As such, each of the likelihood arrays 321, 322, 323, 324, 325 includes ten probability values. For example, L(0) is the probability (probability is here used as a synonym for likelihood) that a particular digit in the meter readout was a "0" when the image was taken. A further example is that $L(4)_{1,1}$=0.304 indicates that there is a 0.304 likelihood that the highest order digit (digit in position 1) in the first image ($I_1$) is a "4". The highest order digit is the initial digit in the meter readout and is the digit in position 1. Similarly, $L(6)_{1,4}$=0.074 indicates that there is a 0. 074 likelihood that the fourth highest order digit (digit in position 4) in the first image ($I_1$) is a "6".

Figure 4A:
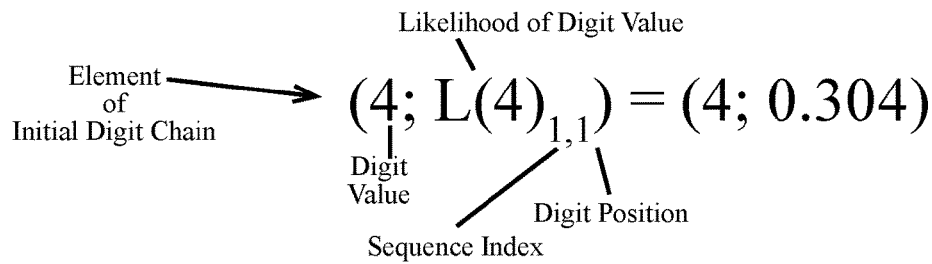
FIG. 4A, FIG. 4B, FIG. 4C, and FIG. 4D are high level conceptual diagrams of an element of an initial digit chain, an initial digit chain, an initial digit path, and producing an initial digit path according to some aspects.
Figure 4B:
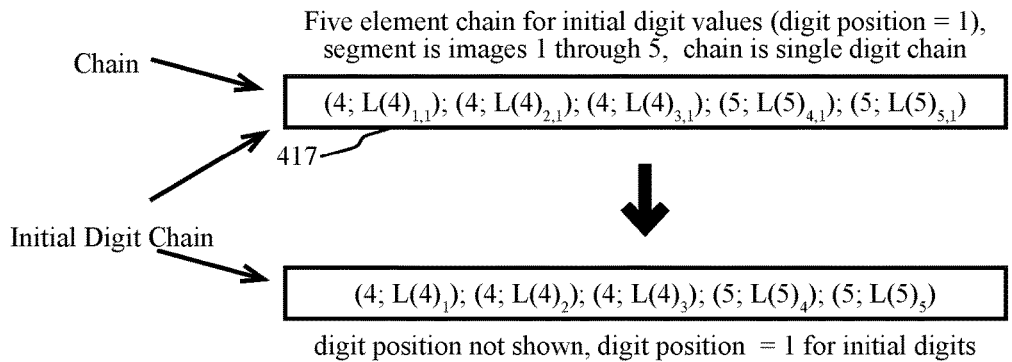
Figure 4C:
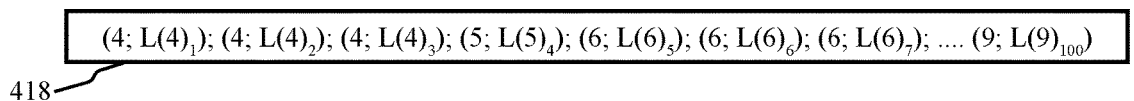

FIG. 4A, FIG. 4B, FIG. 4C, and FIG. 4D are high-level conceptual diagrams of an element of an initial digit chain, an initial digit chain, an initial digit path, and producing an initial digit path according to some aspects. The element of the initial digit chain is a chain element that includes a digit value that is a single digit value and the likelihood of the digit value. A segment is used to indicate a group of the images in the sequence of images. A path contains elements for all of the images in the sequence of meter images. For example, the segment 1-5 indicates images 1-5 (images having sequence indexes 1-5) in the sequence of images. Similarly, the segment i-j indicates image i, image j, and all the images between image i and image j. A chain includes a series of elements for a segment. The elements of a chain indicate a digit value or digit sequence and the probability that the meter readout started with that digit or digit sequence when a meter readout image was taken. For example, an element of an initial digit chain can be (4; $L(4)_{1,1}$). As discussed above, $L(4)_{1,1}$=0.304 and indicates that there is a 0.304 likelihood that the digit in position 1 in $I_1$ is a "4". The initial digit chain 417 that is illustrated in FIG. 4B includes initial digit chain elements for the segment 1-5. Each chain includes only one element for each image. The initial digit path 418 illustrated in FIG. 4C can be spliced together from a set of chains. For example, a chain 445 for the segment 1-5 can be spliced with a chain for the segment 5-9 to produce a chain for the segment 1-9. The segment 1-100 covers the entire sequence of images from $I_1$ to $I_{100}$. As such, the chain for segment 1-100 is called a path.

Figure 4D:
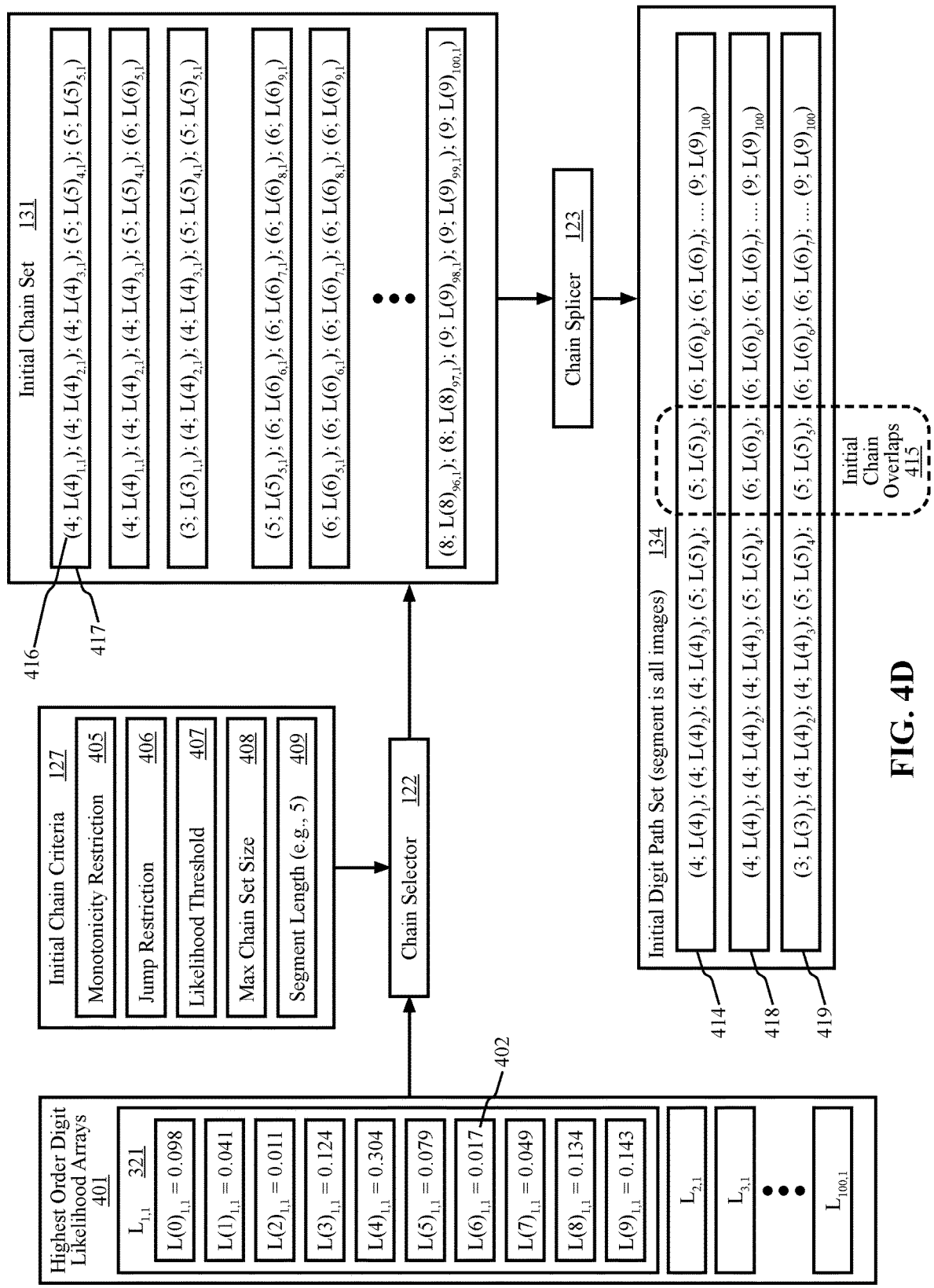

FIG. 4D is a high-level conceptual diagram of producing an initial digit path set 134 that includes initial digit paths 414, 418, 419 according to some aspects. The highest order digit likelihood arrays 401 are the likelihood arrays for the highest order digit in each of the images. Chains are produced for segments of the highest order digit likelihood arrays 401. For example, for a five-element segment (e.g., 1-5 or 5-6) every possible five element chain for a can be produced. There are ten possibilities for each element in the chain, as such 455 there are $10^5$=100,000 possible five element chains for each five-element segment. A chain selector 122 uses initial chain criteria 127 to select some of the possible chains for inclusion in an initial chain set 131. The initial chain criteria 127 can include a monotonicity restriction 405, a jump restriction 406, a likelihood threshold 407, a maximum chain set size 408, and a segment length 409.

A monotonicity restriction 405 indicates that the series of values in the chain is monotonic. For example, a meter readout for a cumulative flow meter should never decrease except for when the meter wraps around. The monotonicity restriction 405 may therefore require that the sequence of digit values never decreases. The monotonicity restrictions may make allowance for the meter wrapping around from the maximum value to the minimum value. A jump restriction 406 can limit the allowable increase from one value in the chain to the next value in the chain. For example, an increase from 1 nnnn to 3 nnnn may be forbidden because the minimum difference in meter readings would be 10001, which may be deemed impossible or extremely unlikely. A likelihood threshold 407 can be used to reject unlikely sequences. A maximum chain set size 408 can be used to limit the number of chains that are included in a chain set. The maximum chain set size may be applied in various ways. One way is to limit the number of chains that are included for each segment. For example, of the 100,000 possible chains for a five-element segment, a maximum of 20 may be included in the chain set. As such, only the 20 most likely chains may be included. Another way is to limit the total number of chains in the chain set. For example, the chain set may be limited to 2000 chains total by discarding the least likely chains. In some implementations, the most likely chain for a segment cannot be discarded. The segment length 409 indicates the length of the segments. For example, a segment length of twenty may indicate that the segments are 1-20, 20-39, 39-58, 58-77, 77-96, and 96-100.

The chain splicer 123 splices the chains where the chains overlap to produce an initial digit path set 134. For example, one segment may be for i-j and the next segment may be for j-k. If two chains have the same value for the elements in position j, then they can be spliced to form a chain for the segment i-k. The chain splicer 123 can form paths by splicing together the chains in the chain set. In the example illustrated in FIG. 4D, three possible paths 414, 418, and 419 have been found by the chain splicer 123. The initial chain overlaps 415 show where the chains for segments 1-5 and 5-9 have been spliced. In FIG. 3A it is seen the sequence of images includes one hundred images beginning with the first image ($I_1$), ending with the last image ($I_{100}$), and further including images for each integer between 1 and 100. The paths 414, 418, 419 include chain elements that are initial digit chain elements as shown in FIG. 4A. Each path includes one hundred chain elements beginning with a first 490 chain element that is associated with the first image, a last chain element that is associated with the last image, and chain elements associated with each of the other images in the image sequences. For example, the nth chain element is associated with the nth image in the image sequence.

FIG. 5A, FIG. 5B, FIG. 5C, and FIG. 5D are high level conceptual diagrams of an element of a two-digit chain, a two-digit chain, and a two-digit path, and producing a two-digit path according to some aspects. The elements of a two-digit chain can indicate two-digit values and the probability that the meter readout started with those two digits when a meter readout image was taken. For example, an element of a two-digit chain can be (40; $L(40)_1$). The likelihood $L(40)_1$ may be calculated as $L(4)_1 * L(0)_{1,2}$. The likelihood $L(4)_1$ can be the absolute probability, the scaled probability, the normalized probability, or some other probability that the first digit in $I_1$ is "4". Similarly, the likelihood $L(40)_1$ can be the absolute probability, the scaled probability, the normalized probability, or some other probability that the first two digits in $I_1$ are "40". $L(4)_{1,1}$=0.304 and $L(0)_{1,2}$=0.266, the absolute probability of $L(40)_1$ may therefore be calculated as 0.304*0.266=0.08086. In some implementations, the likelihood of the single digit value (e.g., $L(4)_1$) may be adjusted or replaced with a scaled probability, a normalized probability, or some other likelihood value. The two-digit chain illustrated in FIG. 5B includes two-digit chain elements for the segment 5-9. The two-digit path illustrated in FIG. 5C can be spliced together from a set of chains.

Figures 5A, 5B, 5C:
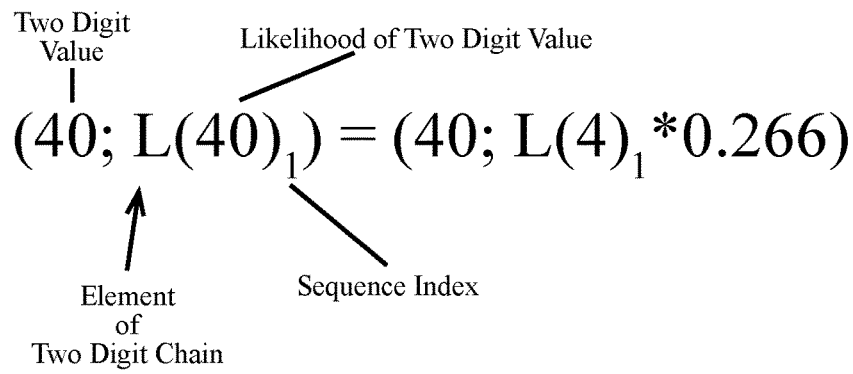
FIG. 5A, FIG. 5B, FIG. 5C, and FIG. 5D are high level conceptual diagrams of an element of a two-digit chain, a two-digit chain, a two-digit path, and producing a two-digit path according to some aspects.
Figure 5D:
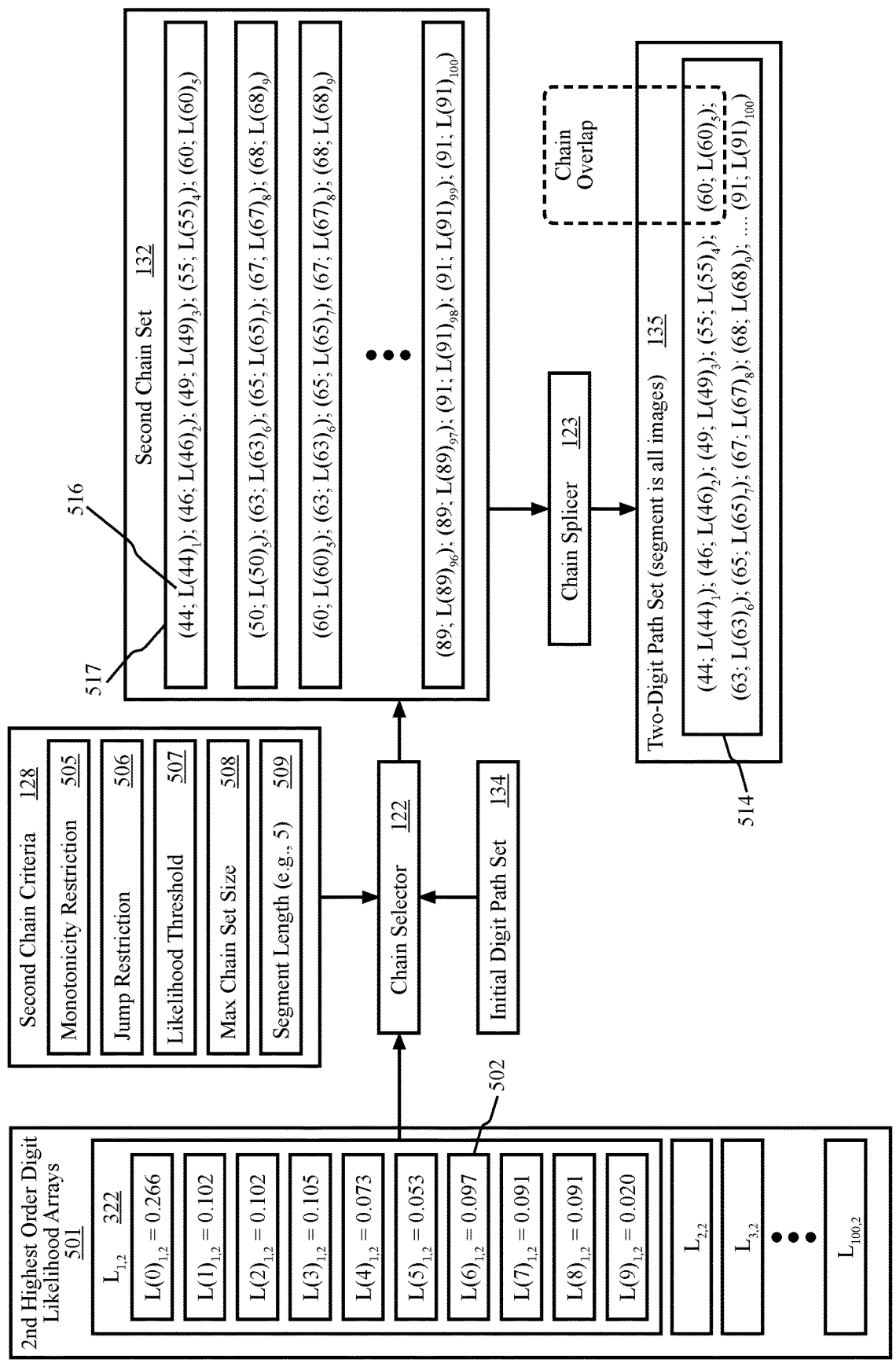

FIG. 5D is a high-level conceptual diagram of producing a two-digit path set 135 that includes the two-digit path 514 according to some aspects. The second highest order digit likelihood arrays 501 are the likelihood arrays for the second digit in each of the images. Two-digit chain elements can be produced from the elements in the paths in the initial digit path set 134 and the second highest order digit likelihood arrays 501. Chains are produced for segments of the two-digit elements. For example, for a five-element segment (e.g., 1-5 or 5-6) every possible five element chain can be produced. There are ten possibilities for each of the second digits. The number of possibilities is also increased by the number of paths in the initial digit path set. For each path in the initial digit path set, there are $10^5$=100,000 possible five element chains for each five-element sequence. The chain selector 122 uses second chain criteria 128 to select some of the possible chains for inclusion in a second chain set 132. The second chain criteria 128 can include a monotonicity restriction 505, a jump restriction 506, a likelihood threshold 507, a maximum chain set size 508, and a segment length 509.

A monotonicity restriction 505 indicates that the series of values in the chain is monotonic. The jump restriction 506 can limit the allowable increase from one value in the chain to the next value in the chain. For example, an increase from 11 nnn to 13 nnn may be forbidden because the minimum difference in meter readings would be 1001, which may be deemed impossible or extremely unlikely. A likelihood threshold 507 can be used to reject unlikely sequences. A maximum chain set size 508 can be used to limit the number of chains that are included in a chain set. The segment length 509 indicates the length of the segments.

The chain splicer 123 splices the chains where the chains overlap to produce a two-digit path set 135 such as two-digit path 514. For example, one segment may be for i-j and the next segment may be for j-k. If two chains have the same value (here, a two-digit value) for the elements in position j, then they can be spliced to form a chain for the segment i-k. The chain splicer 123 can form paths by splicing together the chains in the chain set. In the example illustrated in FIG. 5D, only one possible path 514 has been found by the chain splicer 123. The chain overlap shows where the chains for segments 1-5 and 5-9 have been spliced.

As can be seen, likelihood values that are absolute probability values may get very small as the number of digits increases. The likelihood values shown in FIG. 3B are absolute probability values where the likelihood values in each likelihood array sum to 1. The reason is that absolute probability values tend to be on the order of 0.1 or less and, as such, each multiplication of one likelihood value by another likelihood value often results in a number that is one or two orders of magnitude smaller than the operands. Simplistic algorithms that simply multiply likelihoods without considering the size of the operands may therefore encounter issues where the results of mathematical operations are at or near machine zero. At that point, the calculations are nonsense because the calculations simply produce zero as a result and are not useful. A solution is to use likelihood values that are scaled probabilities, normalized probabilities, logarithms, etc. A scaled probability can be found by multiplying a probability by some value such as 10. A normalized probability may be found by scaling the probabilities of all the elements of a set such that sum equals 1 or some other value. A logarithm (log base 10, log base 2, etc.) of the probabilities may be used by, for example, using the logarithms of the values in the likelihood arrays. Those familiar with mathematics understand that multiplication operations are replaced with addition operations when using logarithms. For example, $\log(x)+\log(y)$ is calculated instead of $x*y$.

There are numerous opportunities for scaling or normalizing the probabilities. The likelihood arrays 126 can be scaled by multiplying them by a value (e.g., 4, 10, etc.) that results in the likelihoods having values that, when multiplied, tend to produce results that are the same order of magnitude as the operands of the multiplication. Another opportunity is to scale likelihood values in the chain sets such as the initial chain set 131, the second chain set 132, etc. For example, a scaling factor can be calculated such that the average likelihood of the chains in the chain set is one or some other value. Yet another opportunity is to scale likelihood values in the path sets such as the initial digit path set 134, the two-digit path set 135, etc. For example, a scaling factor can be calculated such that the average likelihood of the paths in each path set is one or some other value. An alternative is to normalize the path probabilities by selecting a different scaling factor such that the likelihoods of the paths sum to one. Those practiced in computer programming will identify numerous opportunities for scaling, normalizing, or otherwise transforming (e.g., using logarithms) the likelihood values such that the results of mathematical operations do not tend to machine zero or machine infinity.

FIG. 6A, FIG. 6B, FIG. 6C, and FIG. 6D are high level conceptual diagrams of an element of a three-digit chain, a three-digit chain, a three-digit path, and producing a three-digit path according to some aspects. The elements of a three-digit chain can indicate three-digit values and the probability that the meter readout started with those three digits when a meter readout image was taken. For example, an element of a three-digit chain can be (400; $L(400)_1$). The likelihood $L(400)_1$ may be calculated as $L(40)_1*L(0)_{1,3}$. $L(40)_1$ can be the absolute probability, the scaled probability, or the normalized probability that the first two digits in $I_1$ are "40". Similarly, $L(400)_1$ can be the absolute probability, the scaled probability, or the normalized probability that the first three digits in $I_1$ are "400". When absolute probability $L(40)_1=0.08086$ and $L(0)_{1,3}=0.286$, the absolute probability of $L(400)_1$ may therefore be calculated as $0.08086*0.286=0.023127$. As can be seen, the probability values may get very small as the number of digits increases. As such, scaled probabilities or normalized probabilities are sometimes used such that the numbers can be calculated by a computer. In some implementations, the likelihood of the two-digit value (e.g., $L(40)_1$) may be adjusted or replaced with a scaled probability, a normalized probability, or some other likelihood value. The three-digit chain illustrated in FIG. 6B includes three-digit chain elements for the segment 96-100. The three-digit path illustrated in FIG. 6C can be spliced together from a set of chains.

Figures 6A, 6B, 6C:
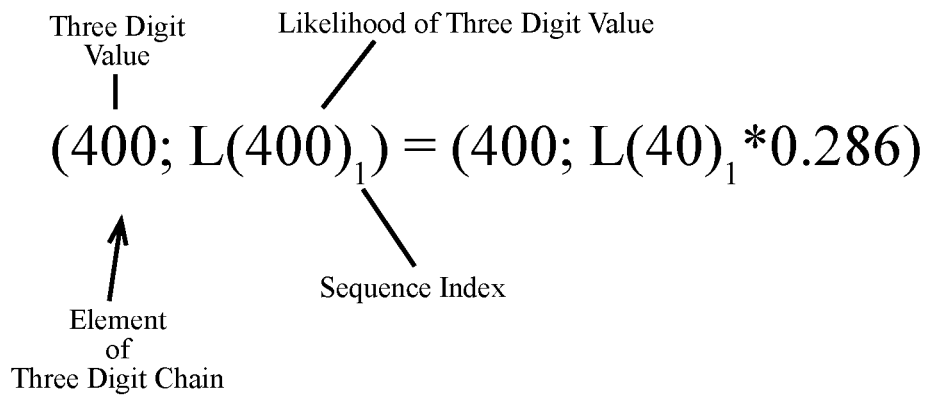
FIG. 6A, FIG. 6B, FIG. 6C, and FIG. 6D are high level conceptual diagrams of an element of a three-digit chain, a three-digit chain, a three-digit path, and producing a three-digit path according to some aspects.
Figure 6D:
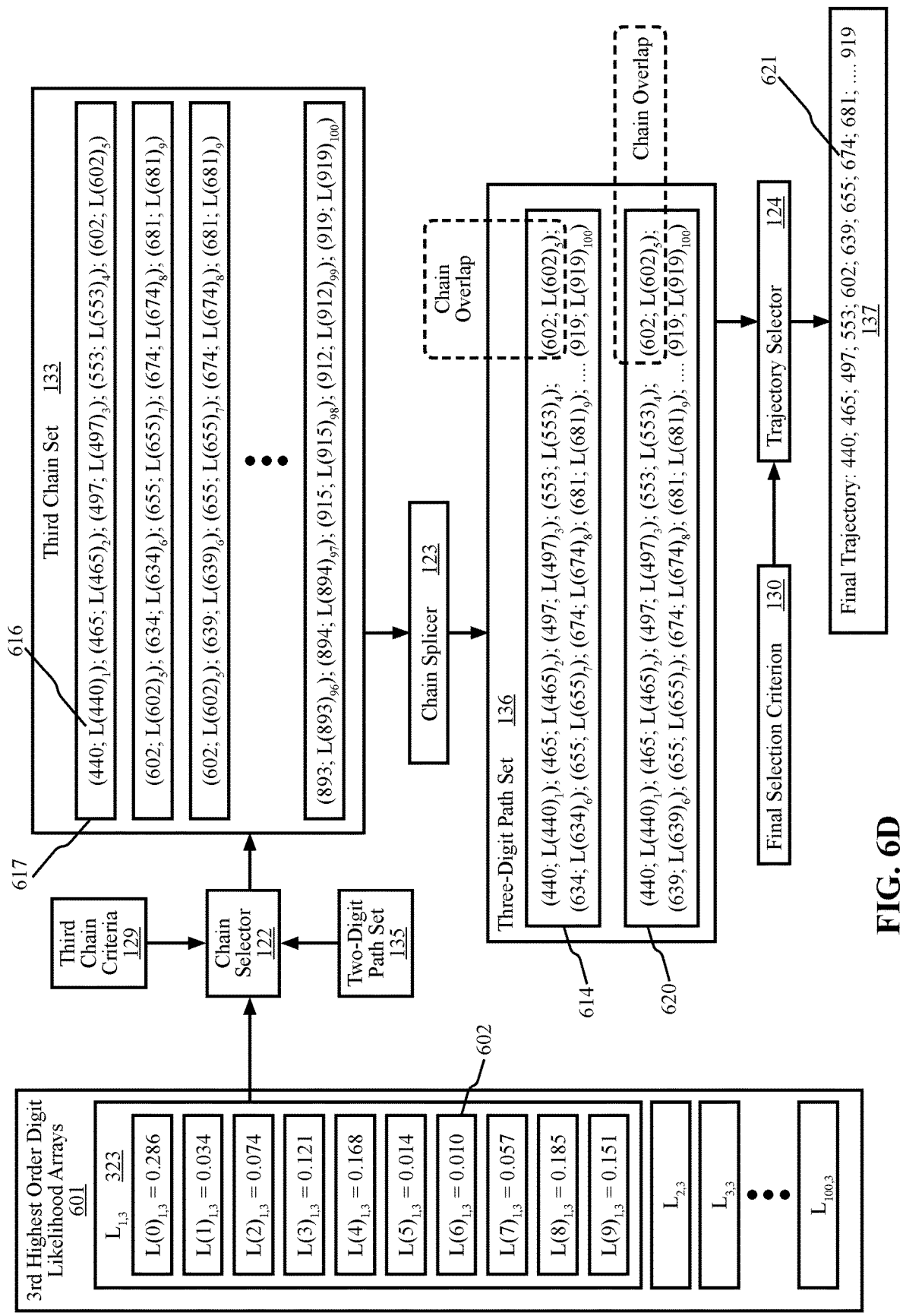

FIG. 6D is a high-level conceptual diagram of producing a three-digit path set 136 that includes three-digit paths 614, 620 according to some aspects. The third highest order digit likelihood arrays 601 are the likelihood arrays for the third digit in each of the images. Three-digit chain elements can be produced from the elements in the paths in the two-digit path set 135 and the third highest order digit likelihood arrays 601. Chains are produced for segments of the three-digit elements. For example, for a five-element segment (e.g., 1-5 or 5-6) every possible five element chain for a can be produced. There are ten possibilities for each of the third digits. The number of possibilities is also increased by the number of paths in the two-digit path set 135. For each path in the two-digit path set, there are $10^5=100,000$ possible five element chains for each five-element sequence. The chain selector 122 uses third chain criteria 129 to select some of the possible chains for inclusion in a third chain set 133. The third chain criteria 129 can include a monotonicity restriction, a jump restriction, a likelihood threshold, a maximum chain set size, and a segment length.

A monotonicity restriction indicates that the series of values in the chain is monotonic. A jump restriction can limit the allowable increase from one value in the chain to the next value in the chain. For example, an increase from 111 nn to 115 nn may be forbidden because the minimum difference in meter readings would be 301, which may be deemed impossible or extremely unlikely. A likelihood threshold can be used to reject unlikely sequences. A maximum chain set size can be used to limit the number of chains that are included in a chain set. The segment length indicates the length of the segments.

The chain splicer 123 splices the chains where the chains overlap to produce a three-digit path set 136. For example, one segment may be for i-j and the next segment may be for j-k. If two chains have the same value (here, a three-digit value) for the elements in position j, then they can be spliced to form a chain for the segment i-k. The chain splicer 123 can form paths by splicing together the chains in the chain set. In the example illustrated in FIG. 6D, two possible paths 614, 620 have been found by the chain splicer 123. The chain overlap shows where the chains for segments 1-5 and 5-9 have been spliced.

The example illustrated in FIG. 6D produces a final trajectory 621 of three-digit values. A trajectory selector 124 uses final selection criterion 130 to select the final trajectory 621. The final selection criterion may indicate that the final trajectory is the path with the highest likelihood. An alternative is to average the paths in the path set to produce a final trajectory. For example, the Nth value in the final trajectory may be the average of the Nth values in the paths. Another alternative is to use weighted averages that scale each path element relative to the likelihood of that path element. Here, a normalized scaling is used and the trajectory elements are the weighted averages.

FIG. 5D shows that paths of one-digit values are used to produce paths of two-digit values. FIG. 6D shows that paths of two-digit values are used to produce paths of three-digit values. The techniques and algorithms used to produce two-digit paths from one-digit paths can be used to produce the three-digit paths from two-digit paths. Those very same techniques and algorithms may be used to produce (n+1)-digit paths from n-digit paths.

Figures 7, 8:
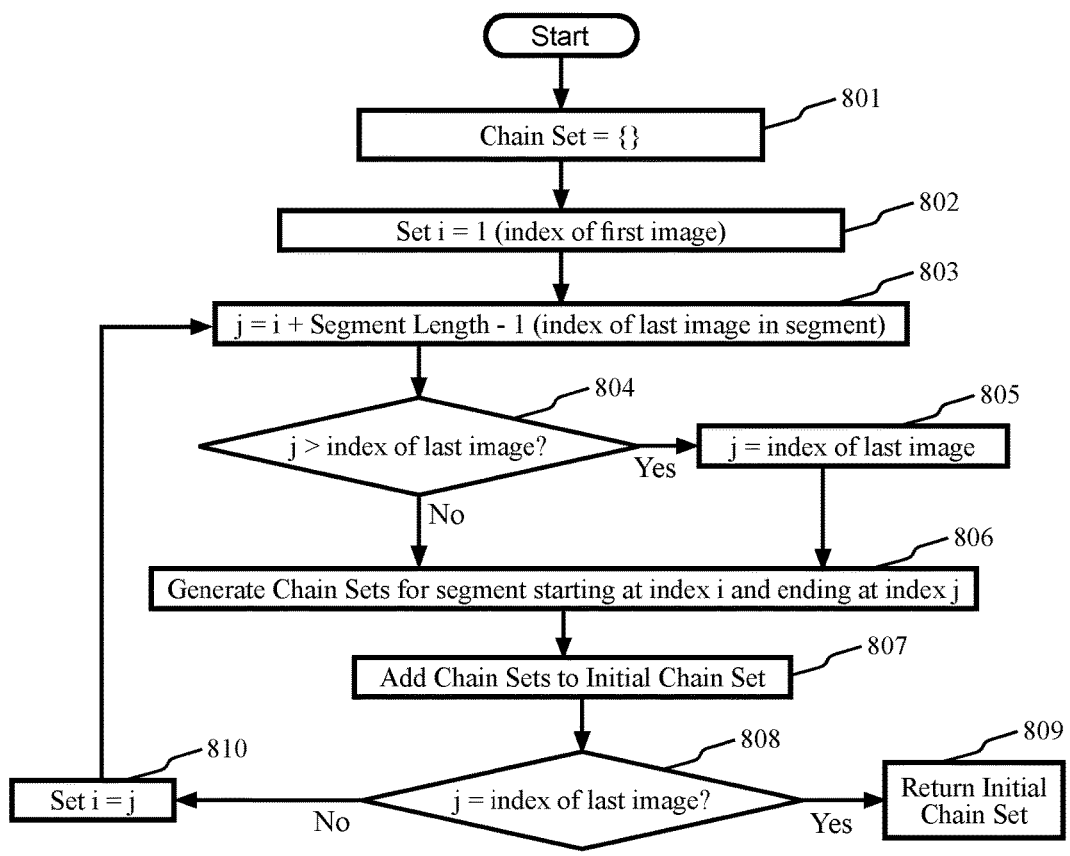
FIG. 7 is a diagram illustrating equations that can be used for calculating the likelihoods of chain elements, according to some embodiments.
FIG. 8 is a high-level flow diagram illustrating a process that produces a chain set, according to some embodiments.

FIG. 7 is a diagram illustrating equations that can be used for calculating the likelihoods of chain elements, according to some embodiments. As discussed above, the likelihoods may be scaled such that they can be calculated and used by a computer. As is well known in numerical analysis, computer processors have limited precision and the best results for many calculations may be obtained by scaling the operands.

FIG. 8 is a high-level flow diagram illustrating a process that produces a chain set, according to some embodiments. After the start, at block 801 the chain set is initialized. There are initially no chains in the chain set. At block 802, the initial value of the first segment is set: i=1. At block 803, the final value of the segment is set. At decision block 804, the process determines if the final value of the segment is greater than the index of the last image in the sequence of images. If not, the process continues to block 806. Otherwise, at block 805 the final value of the segment is set to equal the index of the last image in the sequence of images before the process continues to block 806. At block 806, the process generates chain sets for the segment i-j. The process illustrated in FIG. 9 may perform the action indicated in block 806. At block 807, the process can add the chain sets generated for the segment i-j to the initial chain set. At decision block 808, the process determines if j is the index of the last image in the image sequence. If so, the process returns the initial chain set and is done. Otherwise, at block 810 the process sets i to the starting index of the next segment (i=j) before looping back to block 803.

Figure 9:
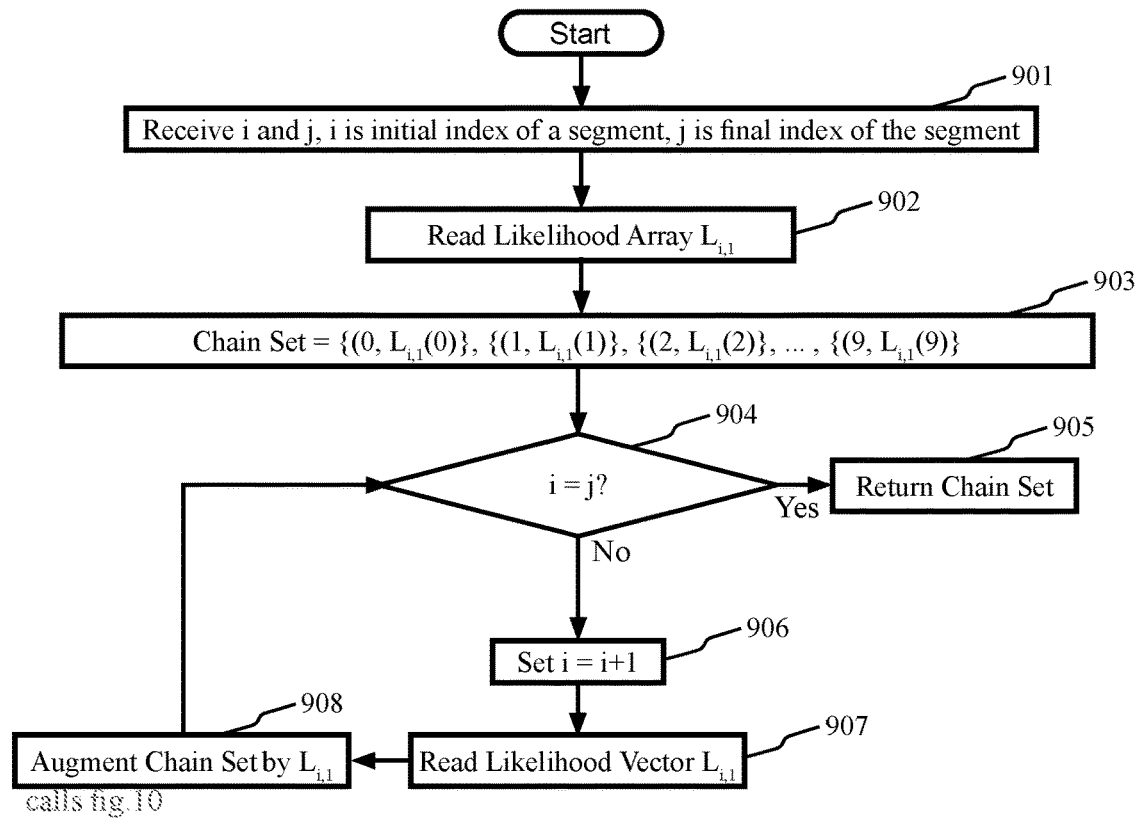
FIG. 9 is a high-level flow diagram illustrating a process that generates chain sets that start at index i and ends at index j, according to some embodiments.

FIG. 9 is a high-level flow diagram illustrating a process that generates chain sets that start at index i and ends at index j, according to some embodiments. After the start, at block 901 the process receives i and j where i is the initial index of a segment, and j is the final index of the segment. At block 902, the process reads likelihood array $L_{i,1}$, which is the likelihood array for the initial digit of the ith image. At block 903, likelihood array $L_{i,1}$, is used to initialize the chain set that is being produced. Note that this chain set may be local to this process. At decision block 904, the process determines if i equals j, which is the index of the last element in the segment. If so, the chain set is returned and the process is done. Otherwise, the process continues to block 906. At block 906, i is incremented to indicate the next element in the segment. At block 907 the process reads likelihood array $L_{i,1}$. At block 908, likelihood array $L_{i,1}$ is used to augment the chain set before the process loops back to decision block 904. The process illustrated in FIG. 10 may be used to augment the chain set. The chain set may be pruned using a process such as the process illustrated in FIG. 14 before the chain set is returned.

Figure 10:
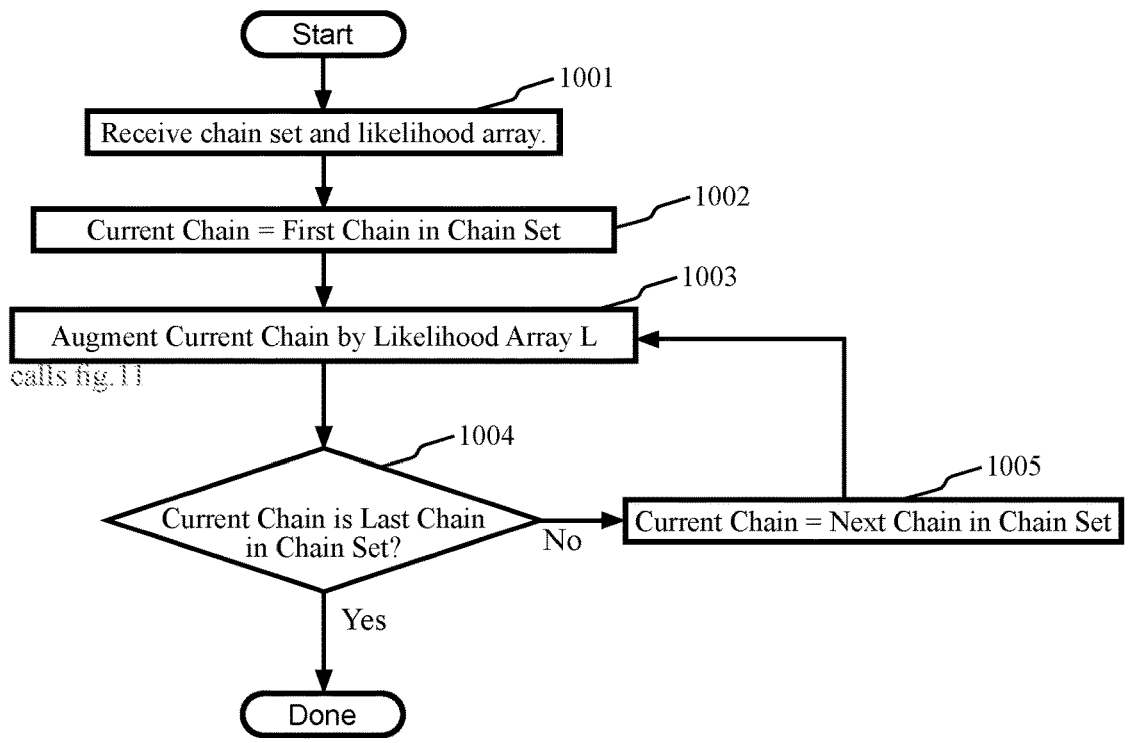
FIG. 10 is a high-level flow diagram illustrating a process that augments a chain set with a likelihood array, according to some embodiments.

FIG. 10 is a high-level flow diagram illustrating a process that augments a chain set with a likelihood array, according to some embodiments. Succinctly, the process of FIG. receives a chain set, steps through the chain set for the first chain to the last, and augments each chain in the chain set. A chain can be augmented by adding an element to the end of the chain. At block 1001, the process receives a chain set and a likelihood array. At block 1002, current chain is set to indicate the first chain in the chain set. At block 1003, the chain indicated by current chain is augmented. The process illustrated in FIG. 11 may be used to augment the chain. At decision block 1004, the process checks if current chain indicates the last chain in the chain set. If so, the process is done. Otherwise, the process moves to block 1005. At block 1005, current chain is set to indicate the next chain in the chain set before the process loops back to block 1003.

Figure 11:
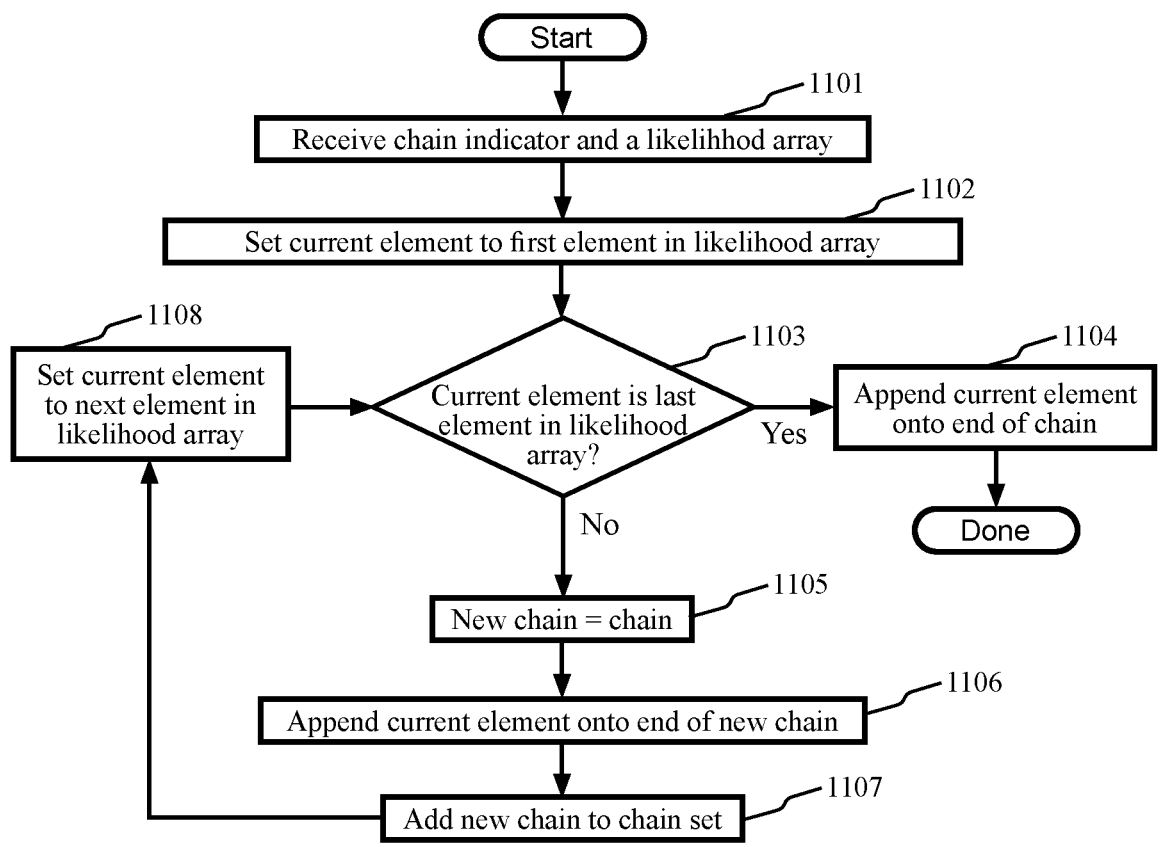
FIG. 11 a high-level flow diagram illustrating a process that augments a chain by appending elements of a likelihood array to the chain, according to some embodiments.

FIG. 11 a high-level flow diagram illustrating a process that augments a chain by appending elements of a likelihood array to the chain, according to some embodiments. Succinctly, if the likelihood array has ten elements, then the process of FIG. 11 can create 10 longer chains from a single chain. As such, the chain has been augmented in the chain set to the extent that it has been replaced with more and longer chains. For example, if a likelihood array has ten elements and the chain has three elements, then the process in essence replaces that three-element chain with ten four-element chains. After the start, at block 1101 the process receives a likelihood array and a chain indicator that indicates the chain. At block 1102, current element is set to the first element in the likelihood array. At decision block 1103, the process determines if the current element is the last element in the likelihood array. If the current element is the last element in the likelihood array, the process moves to block 1104, otherwise the process moves to block 1105. At block 1104, the current element is appended onto the end of the chain. At block 1105, a new chain is created that is the same as the chain. At block 1106, the current element is appended onto the end of the new chain. At block 1107, the new chain is added to the chain set. At block 1108, current element is set to the next element in the likelihood array.

Note that a monotonicity restriction can be applied in a process similar to that illustrated in FIG. 10. For example, if the last element in a chain has the value "N", then only adding those elements that are greater than or equal to "N" can effectively enforce a monotonicity restriction that the chains and path have monotonically increasing element values. Monotonicity restrictions can be applied for meters that always increase (e.g., cumulative flow meters, odometers, etc.) or meters that always decrease (e.g., countdown timers). Similarly, a jump restriction may be applied within the context of FIG. 11. For example, if the value of the last element in the chain is "N" and the jump restriction is the maximum difference between subsequent chain elements is "M", then no new chain is added to the chain set for which the value of the current element is larger than "N+M".

Figure 12:
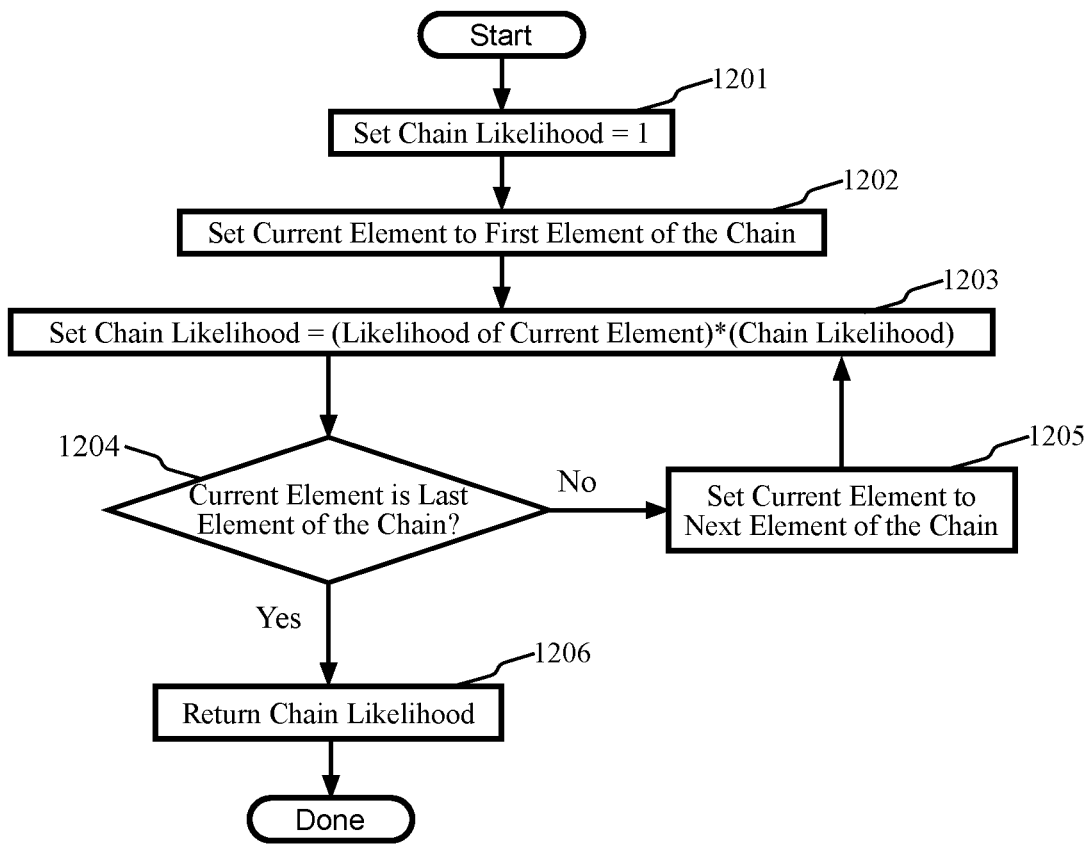
FIG. 12 is a high-level flow diagram illustrating a process that calculates the likelihood of a chain such as an initial digit chain, a two-digit chain, or a three-digit chain, according to some embodiments.

FIG. 12 is a high-level flow diagram illustrating a process that calculates the likelihood of a chain such as an initial digit chain, a two-digit chain, or a three-digit chain, according to some embodiments. At block 1201, the chain likelihood is set to 1. At block 1202, current element is set to the first element of the chain. At block 1203, the chain likelihood is multiplied by the likelihood of the current element. Recall that a chain element, a path element, or an element of a likelihood array can be denoted {value; L(value)} where value is the value of the element and L(value) is the likelihood of the element. At block 1204, the process determines if the current element is the last element in the chain. If so, the process moves to block 1206, otherwise the process moves to block 1205. At block 1205, current element is set to the next element in the chain before the process loops back to block 1203. At block 1206, the chain likelihood is returned and the process is done.

Figure 13:
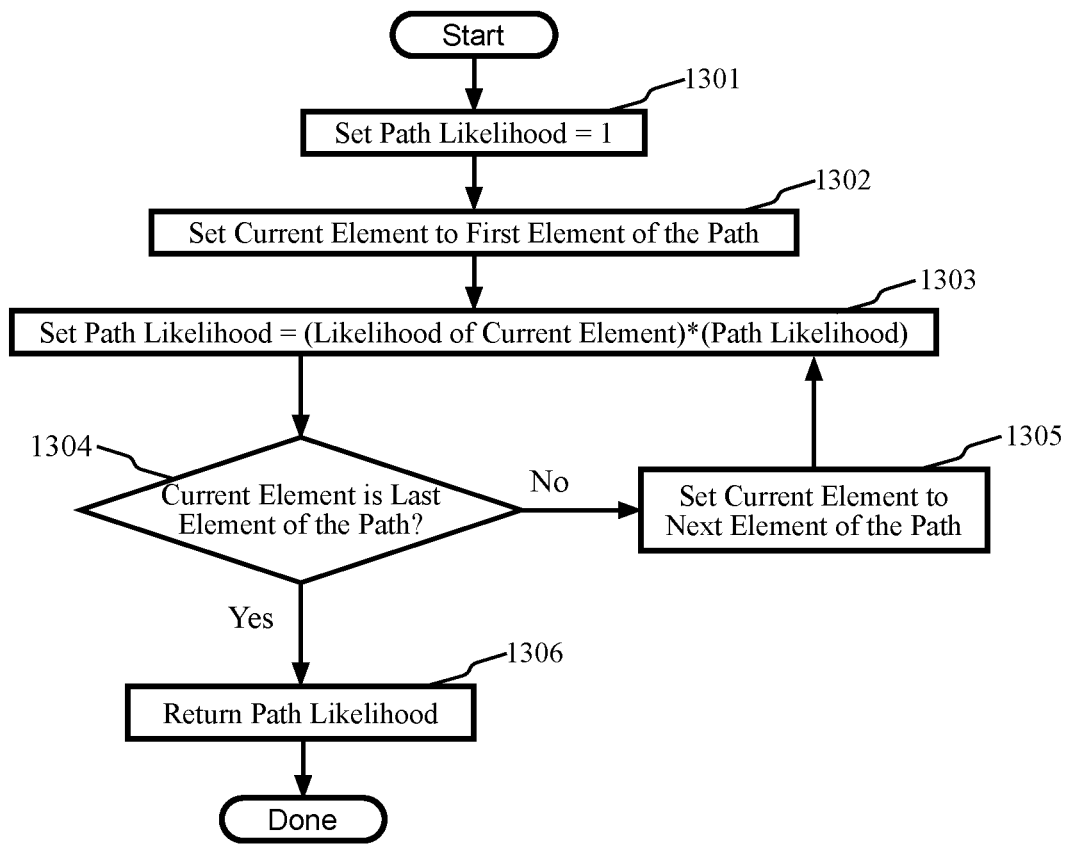
FIG. 13 is a high-level flow diagram illustrating a process that calculates the likelihoods of paths in a path set such as an initial digit path set, a two-digit path set, or a three-digit path set, according to some embodiments.

FIG. 13 is a high-level flow diagram illustrating a process that calculates the likelihoods of paths in a path set such as an initial digit path set, a two-digit path set, or a three-digit path set, according to some embodiments. At block 1301, the path likelihood is set to 1. At block 1302, current element is set to the first element of the path. At block 1303, the path likelihood is multiplied by the likelihood of the current element. At block 1304, the process determines if the current element is the last element in the path. If so, the process 715 moves to block 1306, otherwise the process moves to block 1305. At block 1305, current element is set to the next element in the path before the process loops back to block 1303. At block 1306, the path likelihood is returned and the process is done.

With respect to the calculations of various likelihoods and probabilities such as the likelihoods of chains and paths, the calculated values may be scaled such that the values are within the precision of a computing device such as host machine 101. Those familiar with numerical analysis, calculating probabilities, and machine learning are familiar with such scaling and often implement such scaling.

Figure 14:
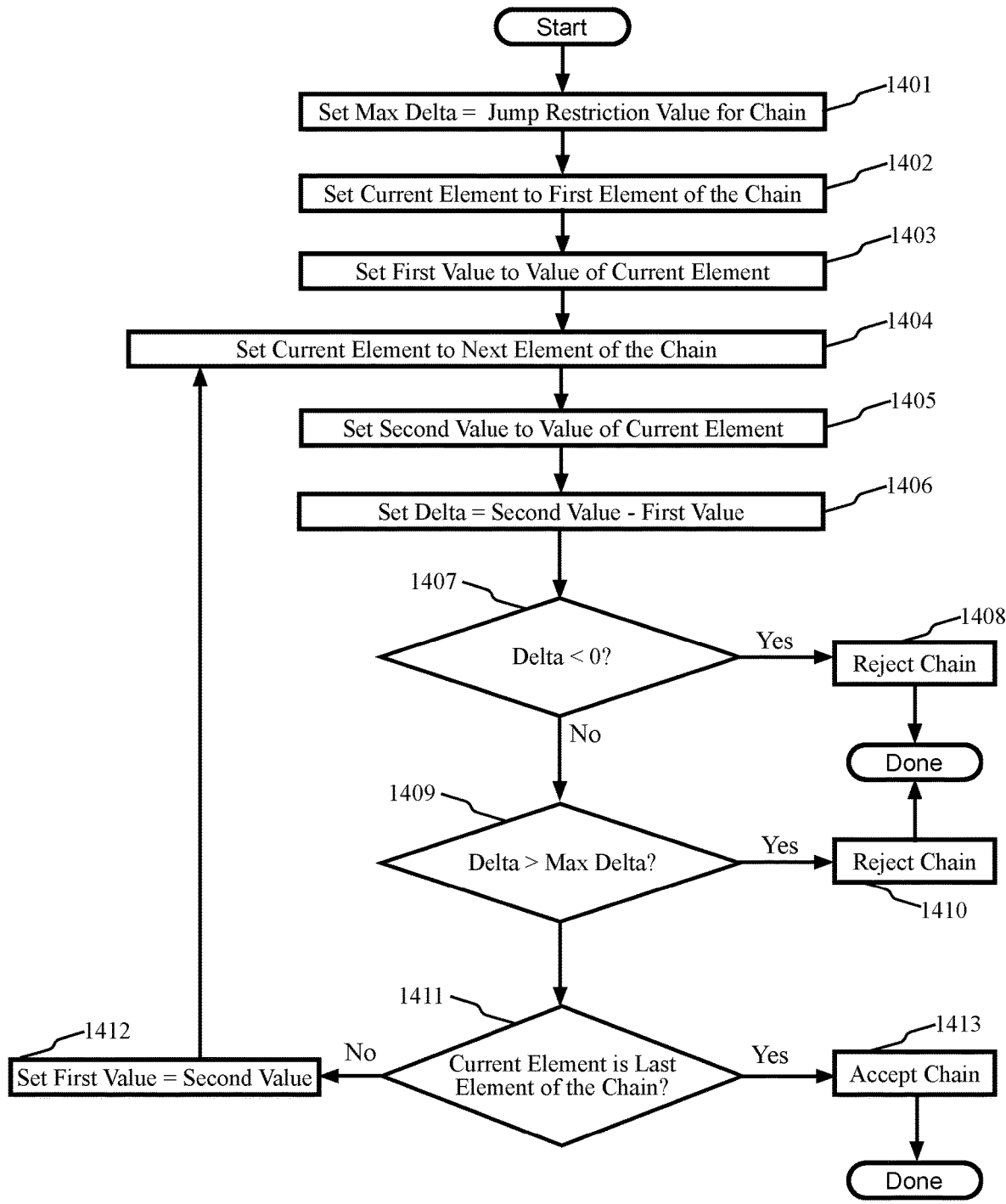
FIG. 14 is a high-level flow diagram illustrating a process that enforces a monotonicity restriction and a jump restriction on a chain, according to some embodiments.

FIG. 14 is a high-level flow diagram illustrating a process that enforces a monotonicity restriction and a jump restriction on a chain, according to some embodiments. At block 1401, max delta is set to the jump restriction value for a chain. At block 1402, current element is set to the first element of the chain. At block 1403, first value is set to the value of the current element. At block 1404, current element is set to the next element of the chain. At block 1405, second value is set to the value of the current element. At block 1406, delta is set to the second value minus the first value. At decision block 1407, the process determines if delta is less than zero. If delta is less than zero, the process moves to block 1408, otherwise the process moves to decision block 1409. At block 1408, the chain is rejected because it violates the monotonicity restriction and then the process is done. At decision block 1409, delta is compared to max delta. The process moves to block 1410 if delta is greater than max delta at decision block 1409. The process moves to decision block 1411 if delta is not greater than max delta at decision block 1409. At block 1410, the chain is rejected because it violates the jump restriction and then the process is done. At decision block 1411, the process determines whether current element is the last element. If current element is the last element, then the chain is accepted at block 1413 and the process is done. Otherwise, the process loops back to block 1404.

Figure 15A:
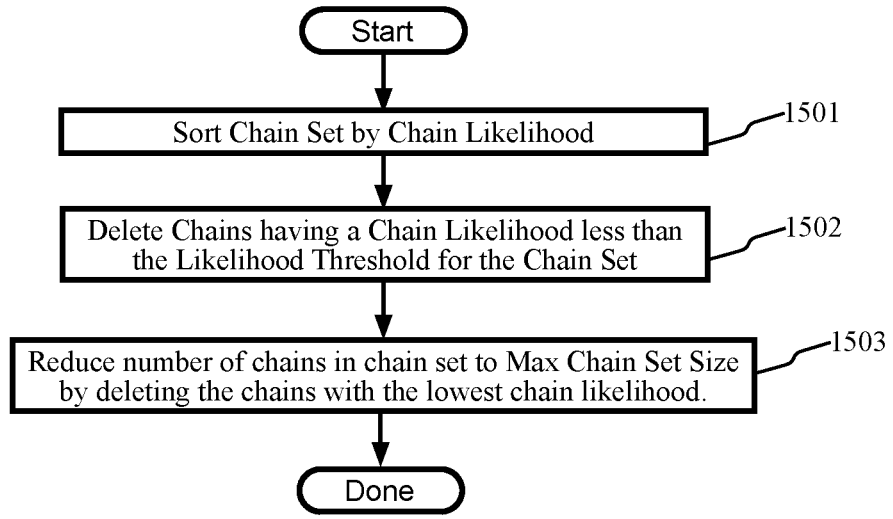
FIG. 15A, and FIG. 15B are high-level flow diagrams illustrating processes that limit the size of a chain set based on a chain likelihood threshold and a maximum chain set size, according to some embodiments.
Figure 15B:
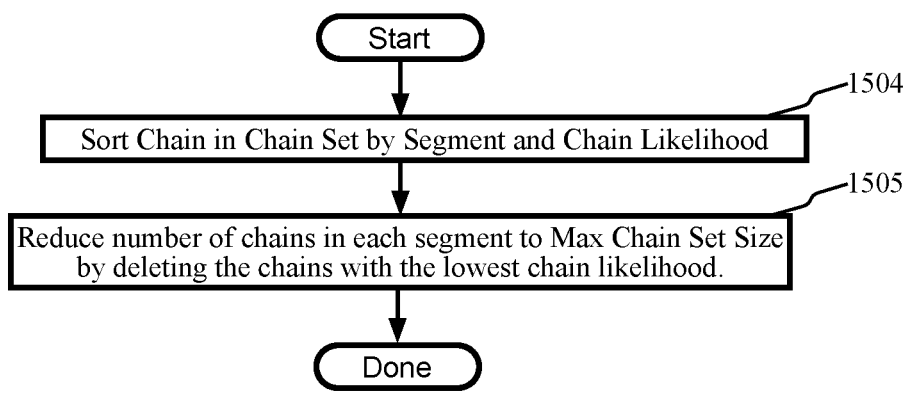

FIG. 15A, and FIG. 15B are high-level flow diagrams illustrating processes that limit the size of a chain set based on a chain likelihood threshold and a maximum chain set size, according to some embodiments.

FIG. 15A illustrates a process that limits the entire chain set to a maximum size. After the start, the process illustrated in FIG. 15A sorts the chain set by chain likelihood at block 1501. For example, the most likely chains may appear first in the chain set while the least likely chains appear last in the chain set. At block 1502, the chains having a likelihood less than a threshold value are deleted. At block 1503, the total number of chains in the chain set can be reduced to the maximum chain set size if the number of chains in the chain set exceeds the maximum chain set size. An alternative may include an aspect that no segment in the chain set is to be reduced to less than one chain.

FIG. 15B limits the number of chains for each segment. After the start, the process illustrated in FIG. 15B sorts the chain set by segment and chain likelihood at block 1504. For example, the most likely chains in the first segment may appear first in the chain set while the least likely chains in the last segment appear last in the chain set. At block 1505, the process can reduce the number of chains in each segment to a maximum of max chain set size by discarding the least likely chains.

Figure 16:
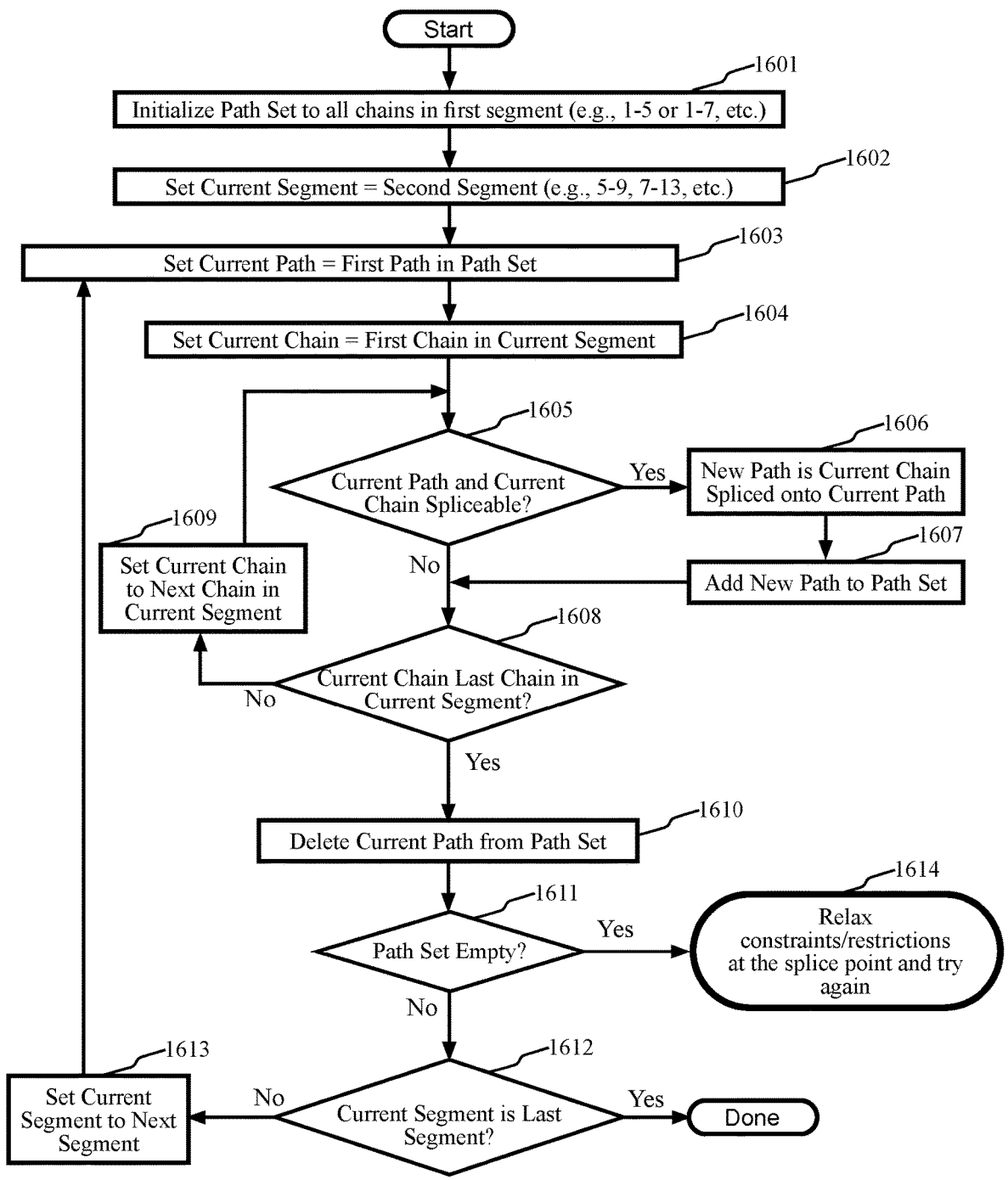
FIG. 16 is a high-level flow diagram illustrating a process that splices chains to produce the paths in a path set, according to some embodiments.

FIG. 16 is a high-level flow diagram illustrating a process that splices chains to produce the paths in a path set, according to some embodiments. The goal of the process of FIG. 16 is to identify all of the possible paths that can be formed by splicing the chain in the chain set. Those practiced in computer programming may find numerous alternatives, advancements, and improvements to the illustrated process that fall within the doctrine of equivalents. At block 1601, the path set is initialized to include all the chains in the first segment. At block 1602, current segment is set to the second segment. At block 1603, the current path is set to the first path in the path set. At block 1604, the current chain is set to the first chain in the current segment. Note that the process fails with no valid paths if no such chain exists. At decision block 1605, the process checks whether the current path and the current chain are spliceable. A path and a chain, or two chains, are spliceable when the highest indexed element of one matches the lowest indexed element of the other. The elements match if and only if they have the same value and the same index. Recall that the index refers to the image from which the elements were produced, seen as the image number in FIG. 4A, FIG. 5A, and FIG. 6A. If the current path and the current chain are spliceable at decision block 1605 then the process moves to block 1606, otherwise the process moves to decision block 1608. At block 1606, a new path is created by splicing the current chain onto the current path (e.g., cut the lowest index element from the chain and append it to the path). At block 1607, the new path is added to the path set.

At decision block 1608 the process checks whether the current chain is the last chain in the segment. The process moves to block 1610 if the current chain is the last chain in the segment and otherwise moves to block 1609. At block 1609, current chain is set to the next chain in the segment before the process loops back to decision block 1605. At block 1610, the current path is deleted from the path set. The reason for deleting the current path is that the current path is part of at least one new path in the path set if there has been a successful splicing with a chain. If there has been no such successful splicing, then the path is a dead end. At decision block 1611, the process determines if the path set is empty. If the path set is empty at decision block 1611 then there can be no path based on the current chain set. The failure to find a path may be accepted or the effort to find a path can be tried again with relaxed restrictions. For example, the chain criteria 127, 128, 129 can be changed such that the chain set contains more chains. It should be noted that the segment where the splicing failed is known because it is the current segment when the path set was found to be empty at decision block 1611. As such, the restrictions can be relaxed at just the current segment, the segment preceding the current segment, or both. If the path set is not empty at decision block 1611, the process moves to decision block 1612. At decision block 1612, the process checks if the current segment is the last segment. If the current segment is the last segment at decision block 1612 then the process is done, otherwise the process moves to block 1613. At block 1613, current segment is set to the next segment before the process loops back to block 1603.

Figure 17:
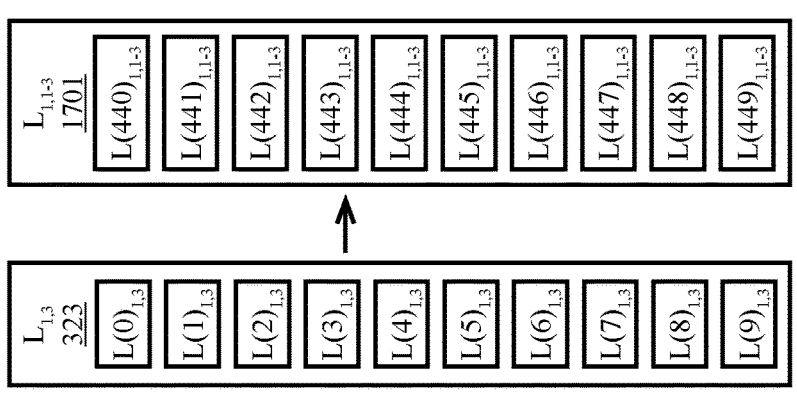
FIG. 17 is a high-level conceptual diagram of producing multi-digit likelihood arrays from a single digit likelihood array and a path, according to some embodiments. As with single digit likelihood arrays, multi-digit likelihood arrays can be used to produce chain sets that include multi-digit chains. Such chains can be spliced to produce path sets that include multi digit paths.
Figure 17:
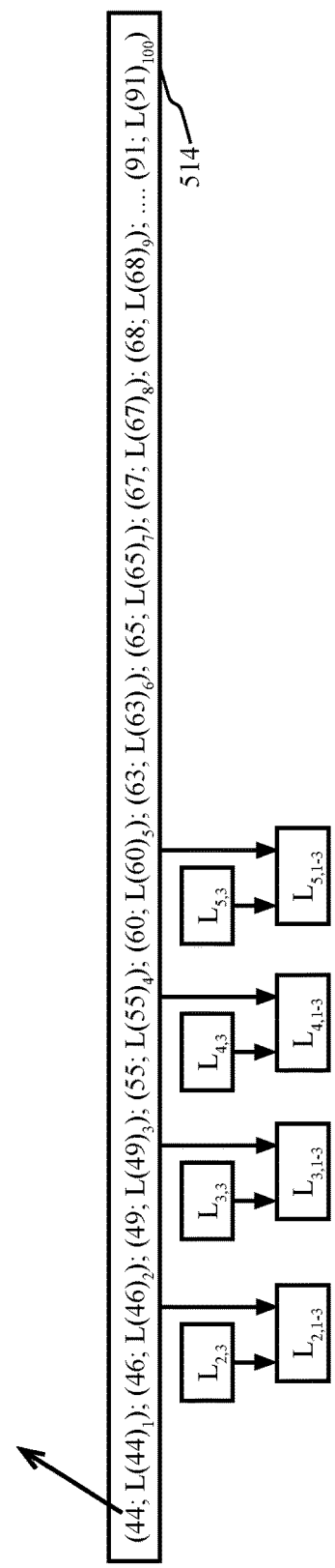

FIG. 17 is a high-level conceptual diagram of producing multi-digit likelihood arrays from a single digit likelihood array and a path, according to some embodiments. As with single digit likelihood arrays being used to produce chain sets that include single digit chains, multi-digit likelihood arrays can be used to produce chain sets that include multi-digit chains. Such chains can be spliced to produce path sets that include multi digit paths. The chain selector 122 is illustrated as using path sets and likelihood arrays to produce chain sets with multi digit chains such as the two-digit chains in FIG. 5D and the three-digit chains in FIG. 6D. Multi digit chains include multi digit elements. As such, multi digit chains can be formed from multi digit likelihood arrays in the same manner as single digit chains can be formed from single digit likelihood arrays. FIG. 17 illustrates using the first element (the element having image/index number=1) of a two-digit path to produce a three-digit likelihood array. That first element is 44; $L(44)_1$. The likelihood array $L_{1,3}$ 323 is the likelihood array for the third digit of image 1. Each of the ten elements in the likelihood array are combined with the first element of the path to produce a three-digit likelihood array that has ten elements. The value of the first element of the path is 44. As such, the three-digit likelihood array is for the three-digit sequences: 440, 441, 442, 443, 444, 445, 446, 447, 448, and 449. The result is the three-digit likelihood array 1701. The same process can be used to produce 100 three-digit likelihood arrays for the three-digit sequences in the 100 images. Once the multi digit likelihood arrays have been produced, multi digit chains can be constructed and placed in a multi digit chain set. The chains in the chain set can be spliced and paths identified.

Figure 18:
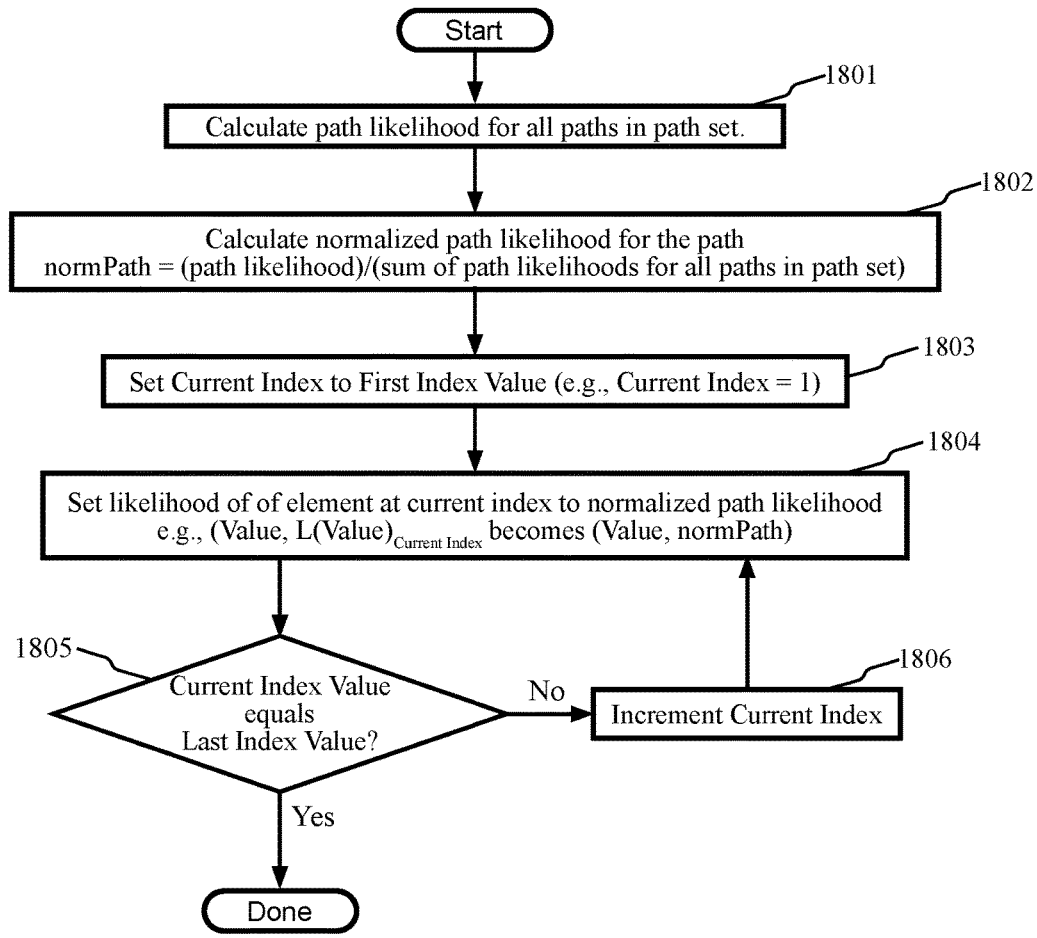
FIG. 18 is a high-level flow diagram illustrating a process that uses normalized path likelihoods to adjust chain element likelihoods, according to some embodiments.

FIG. 18 is a high-level flow diagram illustrating a process that uses normalized path likelihoods to adjust chain element likelihoods, according to some embodiments. After the start, the process can calculate path likelihoods for all of the paths in a path set at block 1801. At block 1802, the process can calculate the normalized path likelihood by, for example, dividing the path likelihood of a path by the sum of the path likelihoods of all the paths in the path set. At block 1803, current index is set to the first index value. For example, the camera can take a sequence of images 126 at a sequence of times with image $I_n$ being taken at time $t_n$ where the subscripted "n" indicates the index value of the image and the time. The first image $I_1$ is taken at time $t_1$ and has an index value, the first index value, equaling 1. The current index value would therefore be set to 1 at block 1803. At block 1803, the likelihood of the element in the path at the current index is set to the normalized path likelihood. At decision block 1805, the process determines if the current index value equals the last index value. If the current index value equals the last index value at block 1805, the process is done, otherwise the process moves to block 1806. At block 1806, the current index is incremented before the process loops back to block 1804.

Figure 19:
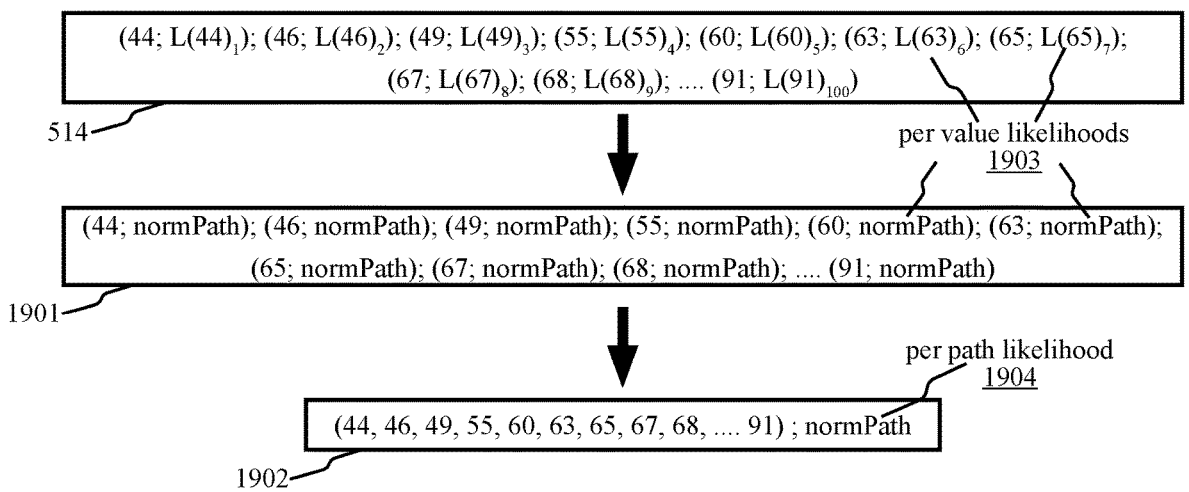
FIG. 19 is a high-level flow diagram illustrating normalized path likelihoods, according to some embodiments.

FIG. 19 is a high-level flow diagram illustrating normalized path likelihoods, according to some embodiments. A path can be a sequence of chain elements. For example, a two-digit path can be a sequence of two-digit chain elements. Each two-digit chain element 835 can include a value (e.g., 44) and a likelihood for that value at that particular position in the path (e.g., $L(44)_1$). The likelihoods of the path elements may be changed for scaling purposes or other algorithmic purposes. For example, the likelihood of each value in a path can be set to the normalized path likelihood for that path. For example, if a path set includes only one path, then the normalized path likelihood equals 1 and the likelihood of each value in the path is set to 1. In another example, the normalized path likelihood for a path equals 0.6 and the likelihood of each value in the path is set to 0.6. A path 1901 may therefore include chain elements that have a value and a likelihood for that value equaling normalized path likelihood for that path. The paths 514, 1901 can include a sequence of path values that are each stored in association with per value likelihoods 1903. In one of the paths 514, the per value likelihoods may be different. In another one of the paths 1901, the per value likelihoods are equal for all of the values in the sequence of path values. When all of the per value likelihoods for the values in a path are equal, then the path may be stored as a sequence of values and a per path likelihood 1904 where the per path likelihood 1904 is the likelihood for each of the values in the sequence of values.

Figure 20:
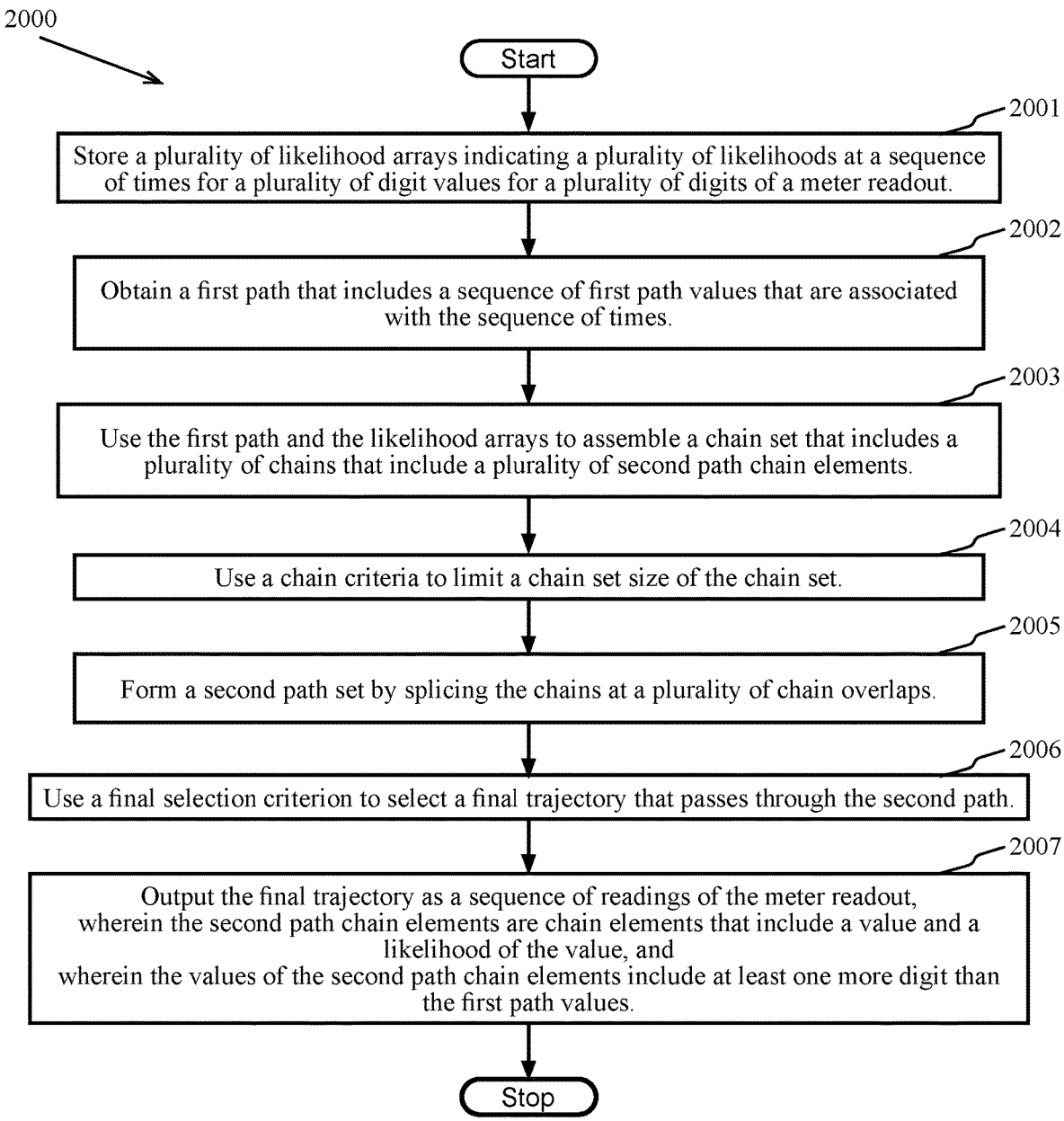
FIG. 20 is a high-level flow diagram illustrating a method that recovers numerical readings of cumulative flow meters based on noisy image data, according to some embodiments.

FIG. 20 is a high-level flow diagram illustrating a method that recovers numerical readings of cumulative flow meters based on noisy image data 2000, according to some embodiments. At block 2001, the method can store a plurality of likelihood arrays indicating a plurality of likelihoods at a sequence of times for a plurality of digit values for a plurality of digits of a meter readout. At block 2002, the method can obtain a first path that includes a sequence of first path values that are associated with the sequence of times. At block 2003, the method can use the first path and the likelihood arrays to assemble a chain set that includes a plurality of chains that include a plurality of second path chain elements. At block 2004, the method can use a chain criteria to limit a chain set size of the chain set. At block 2005, the method can form a second path set by splicing the chains at a plurality of chain overlaps. At block 2006, the method can use a final selection criterion to select a final trajectory that passes through the second path. At block 2007, the method can output the final trajectory as a sequence of readings of the meter readout, wherein the second path chain elements are chain elements that include a value and a likelihood of the value, and wherein the values of the second path chain elements include at least one more digit than the first path values.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware or any combination thereof. The above-described embodiments of the invention may also be implemented, for example, by operating a computer system to execute a sequence of machine-readable instructions. Typically, the computer readable instructions, when executed on one or more processors, implements a method. The instructions may reside in various types of computer readable media. In this respect, another aspect of the present invention concerns a programmed product, comprising a computer readable medium tangibly embodying a program of machine-readable instructions executable by a digital data processor to perform the method in accordance with an embodiment of the present invention. The computer readable media may comprise, for example, RAM (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine readable storage media, such as a DASD storage (e.g., a conventional "hard drive" or a RAID array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A system comprising:
a memory storing a plurality of likelihood arrays indicating a plurality of likelihoods at a sequence of times for a plurality of digit values for a plurality of digits of a meter readout; and
a processor operatively coupled to the memory and configured to:
obtain a first path that includes a sequence of first path values that are associated with the sequence of times;
use the first path and the likelihood arrays to assemble a chain set that includes a plurality of chains that include a plurality of second path chain elements;
use a chain criteria to limit a chain set size of the chain set;
form a second path set by splicing the chains at a plurality of chain overlaps;
use a final selection criterion to select a final trajectory that passes through the second path; and
output the final trajectory as a sequence of readings of the meter readout,
wherein the second path chain elements are chain elements that include a value and a likelihood of the value, and
wherein the values of the second path chain elements include at least one more digit than the first path values.

2. The system of claim 1, wherein:
a sequence of meter images is taken at the sequence of times;
the digits are imaged in the meter images as a plurality of digit images of the digits; and
each one of the likelihood arrays indicates a plurality of digit value likelihoods for only one of the digits and only one of the meter images.

3. The system of claim 1, wherein:
the meter readout includes a highest order digit;
an initial chain set is assembled that includes a plurality of initial digit chains assembled from the likelihood arrays for the highest order digit;
initial chain criteria are used to limit an initial chain set size of the initial chain set;
an initial digit path is formed by splicing the initial digit chains at a plurality of initial chain overlaps; and
the initial digit path is the first path.

4. The system of claim 1, wherein:
the meter readout includes a highest order digit and a second highest order digit;
an initial chain set is assembled that includes a plurality of initial digit chains assembled from the likelihood arrays for the highest order digit;
initial chain criteria are used to limit an initial chain set size of the initial chain set;
an initial digit path is formed by splicing the initial digit chains at a plurality of initial chain overlaps;
the likelihood arrays and the initial digit path are used to assemble a second chain set that includes a plurality of two-digit chains that are sequences of two-digit values for the highest order digit and the second highest order digit;
a second chain criteria is used to limit a second chain set size of the second chain set;
a two-digit path is formed by splicing the two-digit chains at a second plurality of chain overlaps; and
the two-digit path is the first path.

5. The system of claim 1, wherein:
the first path is an initial digit path for a highest order digit of the meter readout;
the second path set is a two-digit path set for the highest order digit and a second highest order digit of the meter readout;
the meter readout includes a third highest order digit;
the likelihood arrays and the two-digit path set are used to assemble a third chain set that includes a plurality of three-digit chains that are sequences of three-digit values for the highest order digit, the second highest order digit, and the third highest order digit;
a third chain criteria is used to limit a third chain set size of the third chain set; and
a three-digit path set is formed by splicing the three-digit chains at a third plurality of chain overlaps,
wherein the final trajectory that passes through a three-digit path in the three-digit path set.

6. The system of claim 1, wherein the chain criteria include a chain likelihood threshold or a maximum chain set size.

7. The system of claim 1, wherein:
the chain criteria include a maximum initial chain set size that limits how many of the chains are included in the chain set; and
the chain set includes the chains that are most likely.

8. The system of claim 1, wherein the chain criteria include a jump restriction.

9. The system of claim 1, wherein the chain criteria include a monotonicity restriction.

10. The system of claim 1, wherein the chain criteria include a requirement that each one of the chains is spliceable with another one of the chains.

11. The system of claim 1 wherein:
a first path set includes two paths;
one of the paths is the first path; and
the likelihood arrays and both of the two paths are used to assemble the chain set.

12. A method comprising:
storing a plurality of likelihood arrays indicating a plurality of likelihoods at a sequence of times for a plurality of digit values for a plurality of digits of a meter readout;
obtaining a first path that includes a sequence of first path values that are associated with the sequence of times;
using the first path and the likelihood arrays to assemble a chain set that includes a plurality of chains that include a plurality of second path chain elements;
using a chain criteria to limit a chain set size of the chain set;
forming a second path set by splicing the chains at a plurality of chain overlaps;
using a final selection criterion to select a final trajectory that passes through the second path; and outputting the final trajectory as a sequence of readings of the meter readout, wherein the second path chain elements are chain elements that include a value and a likelihood of the value, and wherein the values of the second path chain elements include at least one more digit than the first path values.

13. The method of claim 12, wherein:

a sequence of meter images is taken at the sequence of times;

the digits are imaged in the meter images as a plurality of digit images of the digits; and each one of the likelihood arrays indicates a plurality of digit value likelihoods for only one of the digits and only one of the meter images.

14. The method of claim 12, wherein the chain criteria include a chain likelihood threshold.

15. The method of claim 12, wherein the chain criteria include a monotonicity restriction.

16. The method of claim 12, wherein:

the meter readout includes a highest order digit;

an initial chain set is assembled that includes a plurality of initial digit chains assembled from the likelihood arrays for the highest order digit;

initial chain criteria are used to limit an initial chain set size of the initial chain set;

an initial digit path is formed by splicing the initial digit chains at a plurality of initial chain overlaps; and the initial digit path is the first path.

17. A non-transitory computer readable medium storing computer readable instructions, that when executed on one or more processors, implements a method comprising:

storing a plurality of likelihood arrays indicating a plurality of likelihoods at a sequence of times for a plurality of digit values for a plurality of digits of a meter readout;

obtaining a first path that includes a sequence of first path values that are associated with the sequence of times;

using the first path and the likelihood arrays to assemble a chain set that includes a plurality of chains that include a plurality of second path chain elements;

using a chain criteria to limit a chain set size of the chain set;

forming a second path set by splicing the chains at a plurality of chain overlaps;

using a final selection criterion to select a final trajectory that passes through the second path; and outputting the final trajectory as a sequence of readings of the meter readout, wherein the second path chain elements are chain elements that include a value and a likelihood of the value, and wherein the values of the second path chain elements include at least one more digit than the first path values.

18. The non-transitory computer readable medium of claim 17, wherein:

a sequence of meter images is taken at the sequence of times;

the digits are imaged in the meter images as a plurality of digit images of the digits; and each one of the likelihood arrays indicates a plurality of digit value likelihoods for only one of the digits and only one of the meter images.

19. The non-transitory computer readable medium of claim 17, wherein the chain criteria include a chain likelihood threshold.

20. The non-transitory computer readable medium of claim 17, wherein the chain criteria include a jump restriction.

* * * * *